United States Patent
Chae et al.

(10) Patent No.: US 10,986,632 B2
(45) Date of Patent: *Apr. 20, 2021

(54) METHOD AND DEVICE BY WHICH DEVICE-TO-DEVICE USER EQUIPMENT TRANSMITS DATA IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Kijun Kim, Seoul (KR); Byounghoon Kim, Seoul (KR); Joonkui Ahn, Seoul (KR); Suckchel Yang, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

This patent is subject to a terminal disclaimer.

(21) Appl. No.: 16/653,738

(22) Filed: Oct. 15, 2019

(65) Prior Publication Data

US 2020/0045699 A1    Feb. 6, 2020

Related U.S. Application Data

(63) Continuation of application No. 15/305,323, filed as application No. PCT/KR2015/004319 on Apr. 29, 2015, now Pat. No. 10,484,988.

(Continued)

(51) Int. Cl.
*H04W 4/00* (2018.01)
*H04W 72/04* (2009.01)
(Continued)

(52) U.S. Cl.
CPC .......... *H04W 72/0446* (2013.01); *H04B 7/26* (2013.01); *H04W 72/04* (2013.01); *H04W 92/18* (2013.01)

(58) Field of Classification Search
CPC .. H04L 37/26; H04W 72/04; H04W 72/0446; H04W 92/18
See application file for complete search history.

(56) References Cited

U.S. PATENT DOCUMENTS

| 2008/0189360 A1 | 8/2008 | Kiley et al. |
| 2010/0080139 A1 | 4/2010 | Palanki et al. |

(Continued)

FOREIGN PATENT DOCUMENTS

| CN | 102770832 | 11/2012 |
| CN | 103874048 | 6/2014 |

(Continued)

OTHER PUBLICATIONS

Samsung, "Introduction of ProSe", 3GPP TSG RAN WG2 Meeting #89, R2-150443, Feb. 2015, 2 pages.

(Continued)

*Primary Examiner* — Abdelillah Elmejjarmi
(74) *Attorney, Agent, or Firm* — Lee Hong Degerman Kang Waimey

(57) ABSTRACT

A method by which a user equipment (UE) transmits device-to-device (D2D) data in a wireless communication system, according to one embodiment of the present invention, comprises the steps of: determining a bitmap to be applied to a subframe pool for data transmission by using information indicating a time resource pattern (TRP); and transmitting D2D data in a subframe indicated by the bitmap, wherein a set of bitmaps indicatable by the information indicating the TRP when a radio resource control (RRC) information element related to a TRP subset is configured in (Continued)

the UE is a subset of a bitmap set indicatable by the information indicating the TRP when the UE is not concerned in the RRC information element related to the TRP subset.

6 Claims, 11 Drawing Sheets

Related U.S. Application Data

(60) Provisional application No. 62/040,412, filed on Aug. 21, 2014, provisional application No. 62/037,124, filed on Aug. 14, 2014, provisional application No. 61/992,205, filed on May 12, 2014, provisional application No. 61/991,447, filed on May 9, 2014, provisional application No. 61/986,093, filed on Apr. 29, 2014.

(51) Int. Cl.
*H04B 7/26* (2006.01)
*H04W 92/18* (2009.01)

(56) References Cited

U.S. PATENT DOCUMENTS

| | | |
|---|---|---|
| 2013/0148566 A1 | 6/2013 | Doppler et al. |
| 2015/0271800 A1 | 9/2015 | Panteleev et al. |
| 2016/0128047 A1 | 5/2016 | Yang et al. |
| 2017/0019822 A1 | 1/2017 | Zhao et al. |
| 2017/0041932 A1 | 2/2017 | Chae et al. |

FOREIGN PATENT DOCUMENTS

| | | |
|---|---|---|
| EP | 3139683 | 3/2017 |
| WO | 2012019348 | 2/2012 |
| WO | 2012177002 | 12/2012 |
| WO | 2013141546 | 9/2013 |
| WO | 2013143440 | 10/2013 |
| WO | 2013191518 | 12/2013 |

OTHER PUBLICATIONS

PCT International Application No. PCT/KR2015/004319, Written Opinion of the International Searching Authority dated Aug. 26, 2015, 18 pages.
European Patent Office Application Serial No. 15785506.5, Search Report dated Nov. 22, 2017, 7 pages.
United States Patent and Trademark Office U.S. Appl. No. 15/305,323, Final Office Action dated Mar. 22, 2019, 12 pages.
United States Patent and Trademark Office U.S. Appl. No. 15/305,323, Office Action dated Aug. 10, 2018, 25 pages.
Intel, "Discussion on Time Resource Pattern of Transmission", 3GPP TSG RAN WG1 Meeting #80, R1-150235, Feb. 2015, 5 pages.
CMCC, "Further Discussion on TXRU Virtualization", 3GPP TSG RAN WG1 Meeting #80, R1-150443, Feb. 2015, 6 pages.
Intel, et al., "WF on T-RPT Subset Configuration", 3GPP TSG RAN WG1 Meeting #78bis, R1-144394, Oct. 2014 3 pages.
Intel, "Discussion on D2D Operation within Network Coverage (Mode-1)", 3GPP TSG RAN WG1 Meeting #76bis, R1-141164, Apr. 2014, 7 pages.
The State Intellectual Property Office of the People's Republic of China Application Serial No. 201580023266.0, Office Action dated Nov. 2, 2018, 6 pages.

FIG. 9
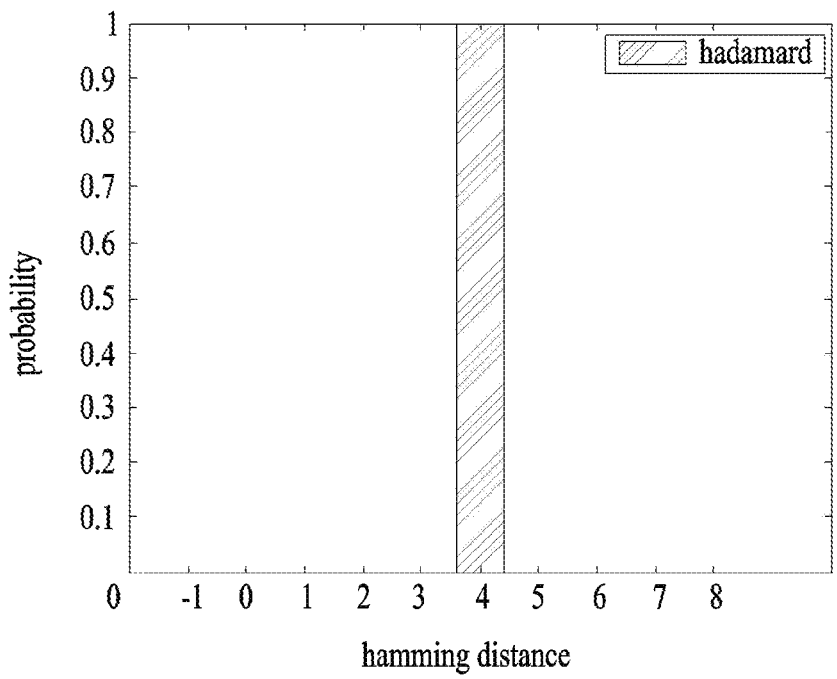
Distribution of Hamming distance of Hadamard code when only $H_n$ is used
(a)
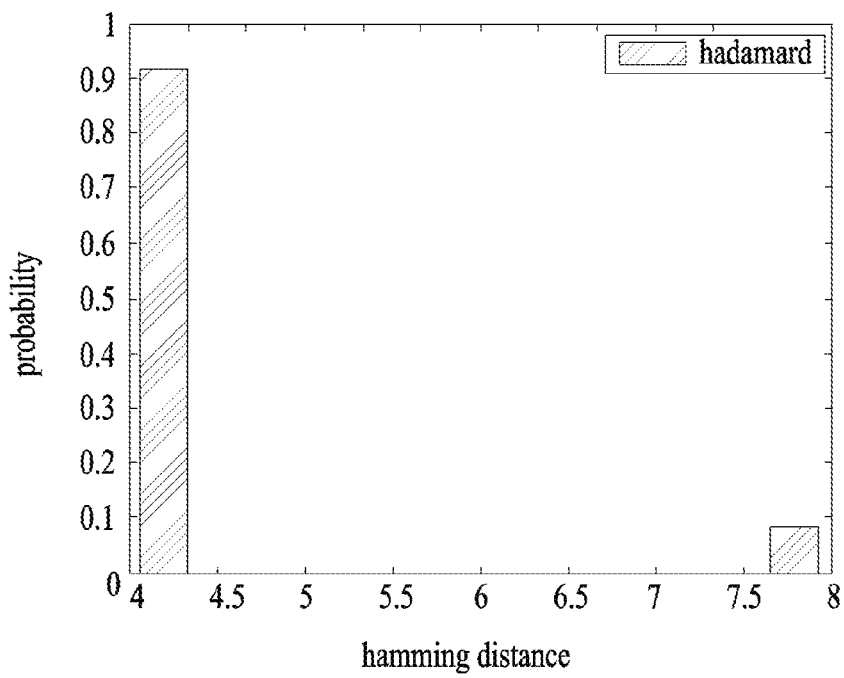
Distribution of Hamming distance of Hadamard code when both $H_n$ and $\bar{H}_n$ are used
(b)

METHOD AND DEVICE BY WHICH DEVICE-TO-DEVICE USER EQUIPMENT TRANSMITS DATA IN WIRELESS COMMUNICATION SYSTEM

CROSS-REFERENCE TO RELATED APPLICATIONS

This application is a continuation of U.S. patent application Ser. No. 15/305,323, filed on Oct. 19, 2016, now U.S. Pat. No. 10,484,988, which is the National Stage filing under 35 U.S.C. 371 of International Application No. PCT/KR2015/004319, filed on Apr. 29, 2015, which claims the benefit of U.S. Provisional Application No. 61/986,093, filed on Apr. 29, 2014, 61/991,447, filed on May 9, 2014, 61/992,205, filed on May 12, 2014, 62/037,124, filed on Aug. 14, 2014, and 62/040,412, filed on Aug. 21, 2014, the contents of which are all hereby incorporated by reference herein in their entirety.

TECHNICAL FIELD

The present invention relates to a wireless communication system, and more particularly, to a method and apparatus for transmitting data in Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that with the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to define data transmission by a time resource pattern.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Problem

In an aspect of the present invention, provided herein is a method of transmitting Device-to-Device (D2D) data by a User Equipment (UE) in a wireless communication system, including determining a bitmap to be applied to a subframe pool for data transmission, using information indicating a Time Resource Pattern (TRP), and transmitting the D2D data in a subframe indicated by the bitmap, wherein, if a Radio Resource Control (RRC) information element relating to a TRP subset is configured for the UE, a set of bitmaps that can be indicated by information indicating the TRP is a subset of the set of the bitmaps that can be indicated by the information indicating the TRP when the UE is irrelevant to the RRC information element relating to the TRP subset.

The information indicating the TRP may be an index indicating any one bitmap out of the set of the bitmaps.

The RRC information element relating to the TRP subset may restrict a value usable as the index.

The RRC information element relating to the TRP subset may be for a transmission mode 2 UE.

The determining the bitmap may include determining a subframe indication bitmap corresponding to the information indicating the TRP, and determining the bitmap to be applied to a pool of a subframe for data transmission from the subframe indication bitmap.

The information indicating the TRP may be included in D2D control information.

In another aspect of the present invention, provided herein is a User Equipment (UE) for transmitting Device-to-Device (D2D) data in a wireless communication system, including a transmission module; and processor, wherein the processor is configured to determine a bitmap to be applied to a subframe pool for data transmission, using information indicating a Time Resource Pattern (TRP) and to transmit the D2D data in a subframe indicated by the bitmap, and if a Radio Resource Control (RRC) information element relating to a TRP subset is configured for the UE, a set of bitmaps that can be indicated by information indicating the TRP is a subset of the set of the bitmaps that can be indicated by the information indicating the TRP when the UE is irrelevant to the RRC information element relating to the TRP subset.

The information indicating the TRP may be an index indicating any one bitmap out of the set of the bitmaps.

The RRC information element relating to the TRP subset may restrict a value usable as the index.

The RRC information element relating to the TRP subset may be for a transmission mode 2 UE.

The processor configured to determine the bitmap may determine a subframe indication bitmap corresponding to the information indicating the TRP and determine the bitmap to be applied to a pool of a subframe for data transmission from the subframe indication bitmap.

The information indicating the TRP may be included in D2D control information.

Advantageous Effects

According to embodiments of the present invention, interference/collision between D2D UEs can be minimized.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7 to 11 are diagrams for explaining methods of generating a time resource pattern according to embodiments of the present invention.

BEST MODE

Figure 1:
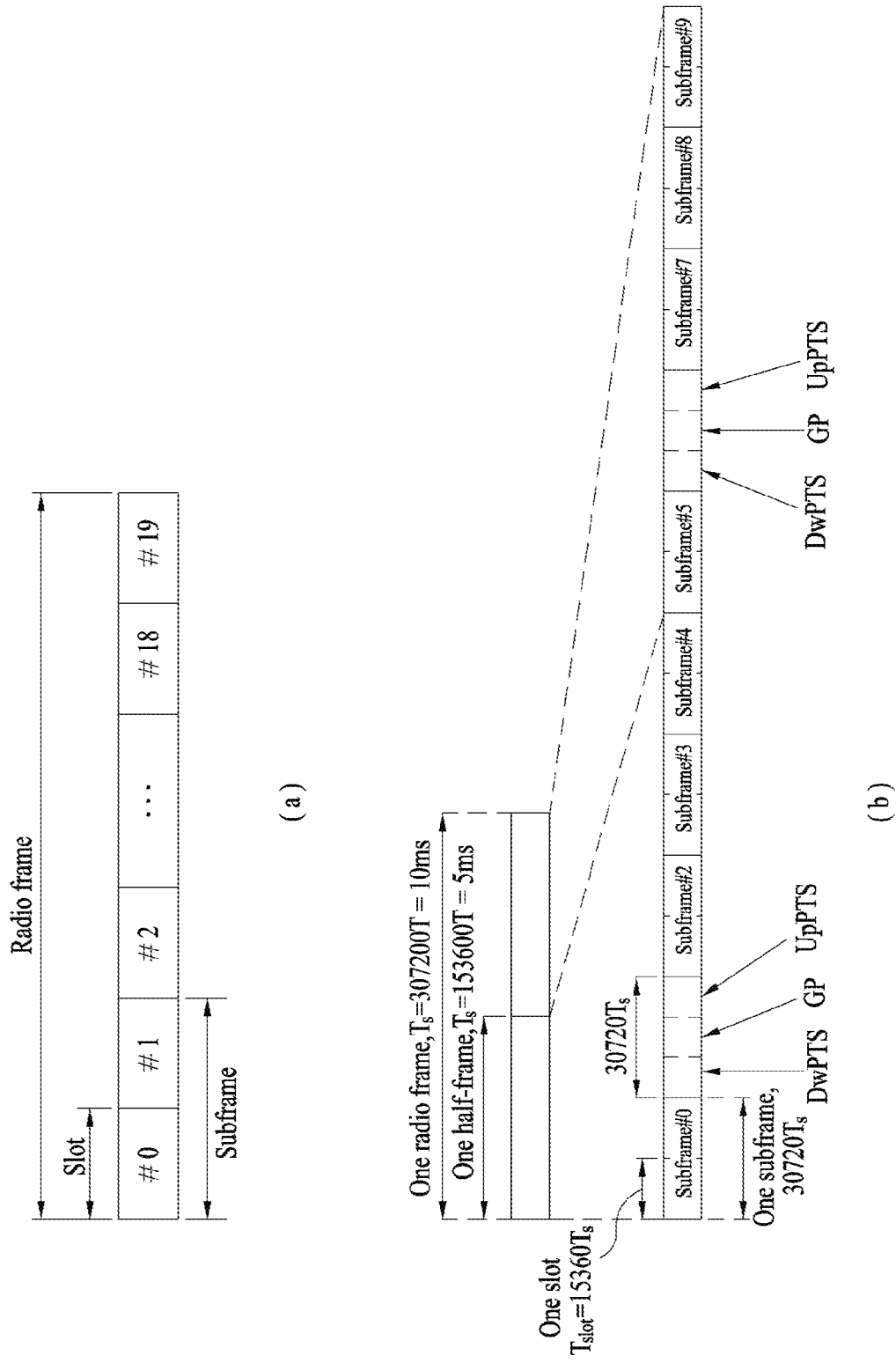
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)". In the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
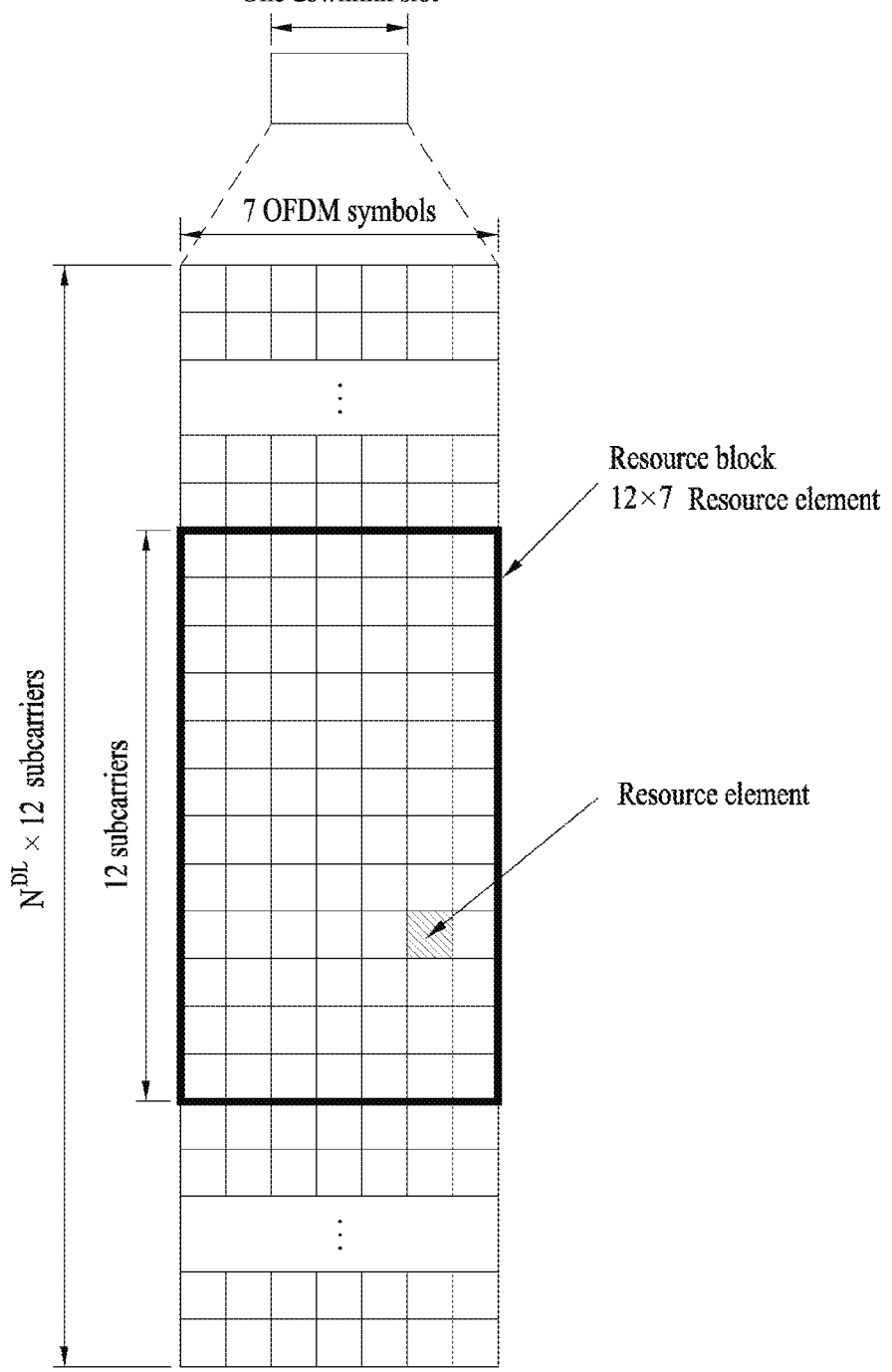
FIG. 2 illustrates a structure of a downlink resource grid for the duration of one downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12 7 REs. The number NDL of RBs included in a downlink slot depends on a DL transmission bandwidth. A UL slot may have the same structure as a DL slot.

Figure 3:
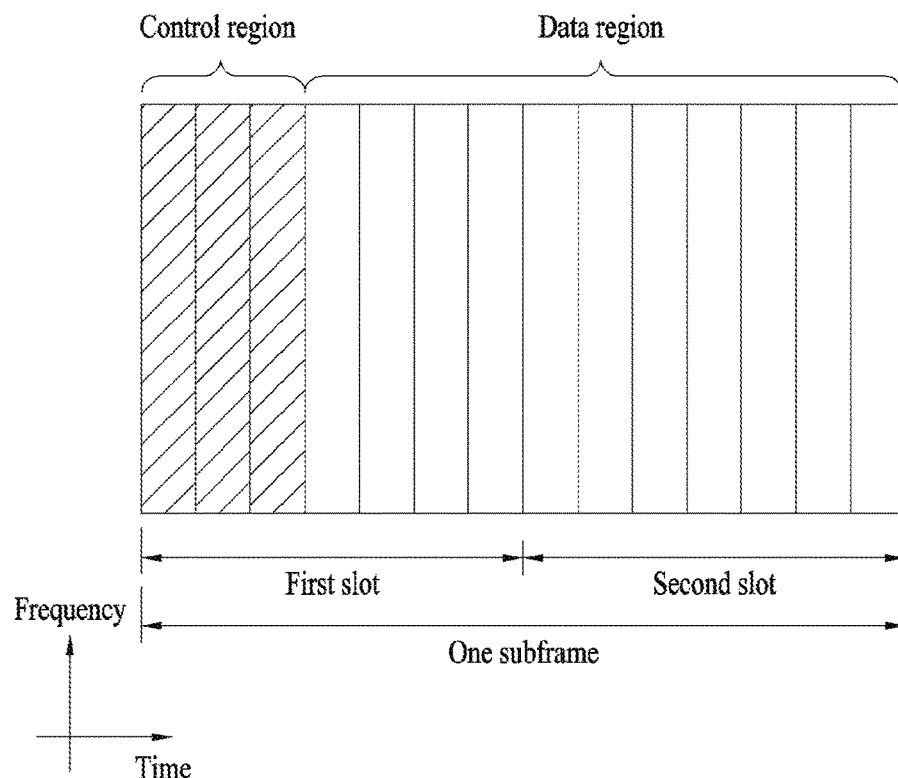
FIG. 3 illustrates a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
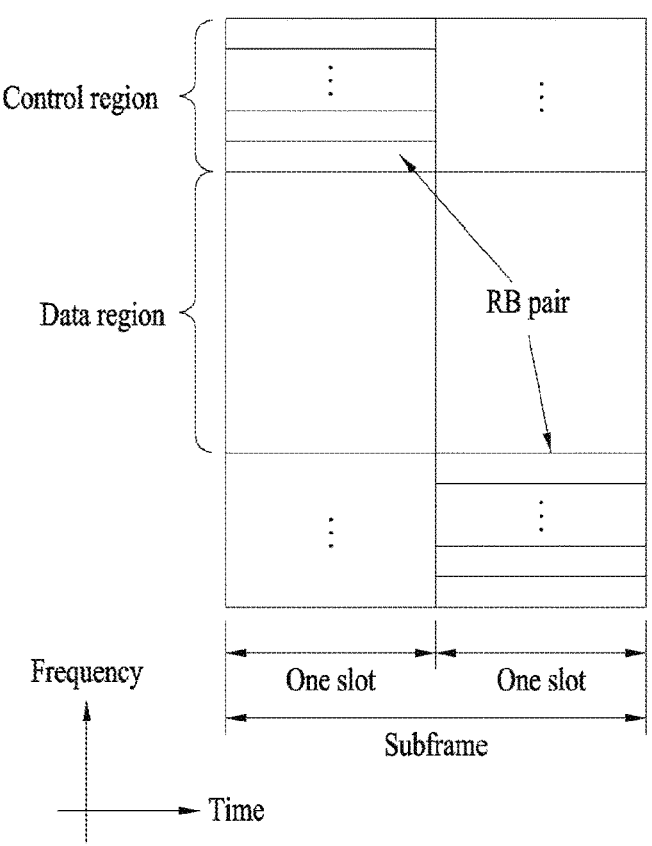
FIG. 4 illustrates a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS), and the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 5:
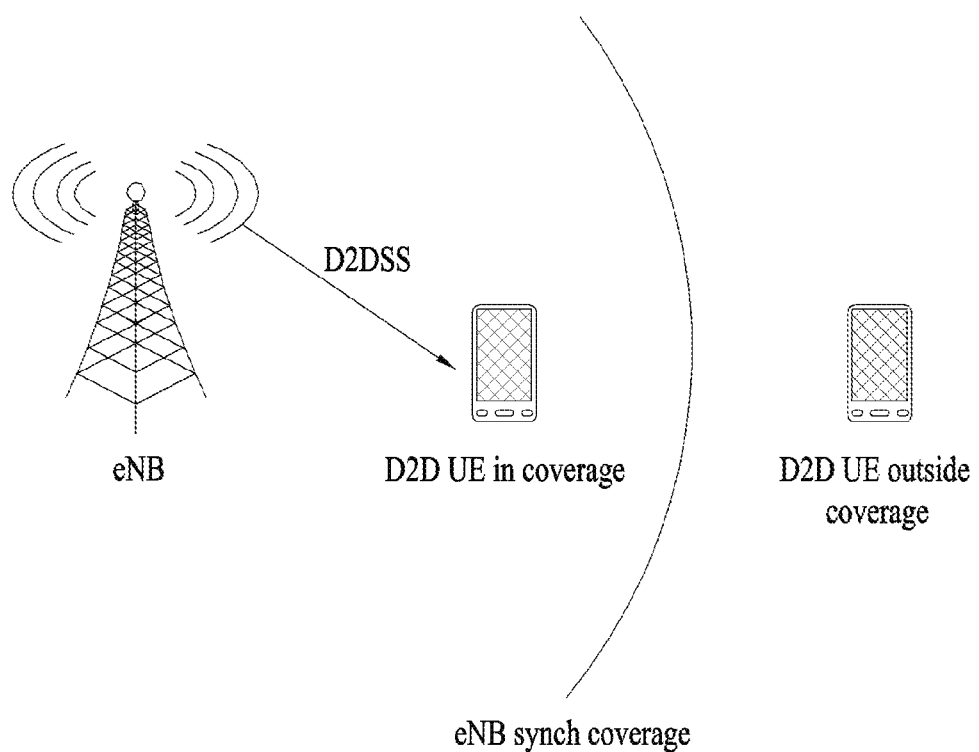
FIG. 5 illustrates relay of a synchronization signal.

In a situation illustrated in FIG. 5, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE. FIG. 5 illustrates an exemplary case in which a D2DSS is relayed and communication is conducted between D2D UEs based on the relayed D2DSS.

A Time Resource Pattern (TRP) for use in transmitting data, a discovery signal, etc. by a UE will be described according to various embodiments of the present invention. The term 'TRP' may be interchangeably used with 'Resource Pattern for Transmission (RPT)' or 'Time-RPT (T-RPT)'. However, the terms should not be construed as limiting the scope of the present invention. Thus, it is clarified that a resource pattern having TRP properties as described below corresponds to a TRP. In the following description, a scheme for indicating the position of transmission resources by an eNB/UE is referred to as mode 1/type 2 and a scheme for indicating the position of transmission resources in a specific resource pool by a transmitting UE (by the UE's selection) is referred to as mode 2/type 1. In the following description, Scheduling Assignment (SA) may mean control information related to D2D data transmission and a channel carrying the control information. Before data transmission, an SA may first be transmitted. A receiving D2D UE may determine the position of resources carrying the data by decoding the SA and then receive a D2D signal in the resources. In the following description, D2D may be referred to as sidelink. For the convenience of description, the term 'TRP indication bit sequence' may be used. The TRP indication bit sequence may include only an ID included in an SA. If the SA includes an additional bit field indicating a TRP, the TRP indication bit sequence may be interpreted as ID+TRP bit sequence. Or a bit sequence for indicating a TRP independent of the ID may be included in the SA. In this case, the TRP bit sequence may be interpreted as the TRP indication bit sequence. A set of bit sequences used to indicate a TRP, included and transmitted in the SA may be interpreted as the TRP indication bit sequence.

TRP

Figure 6:
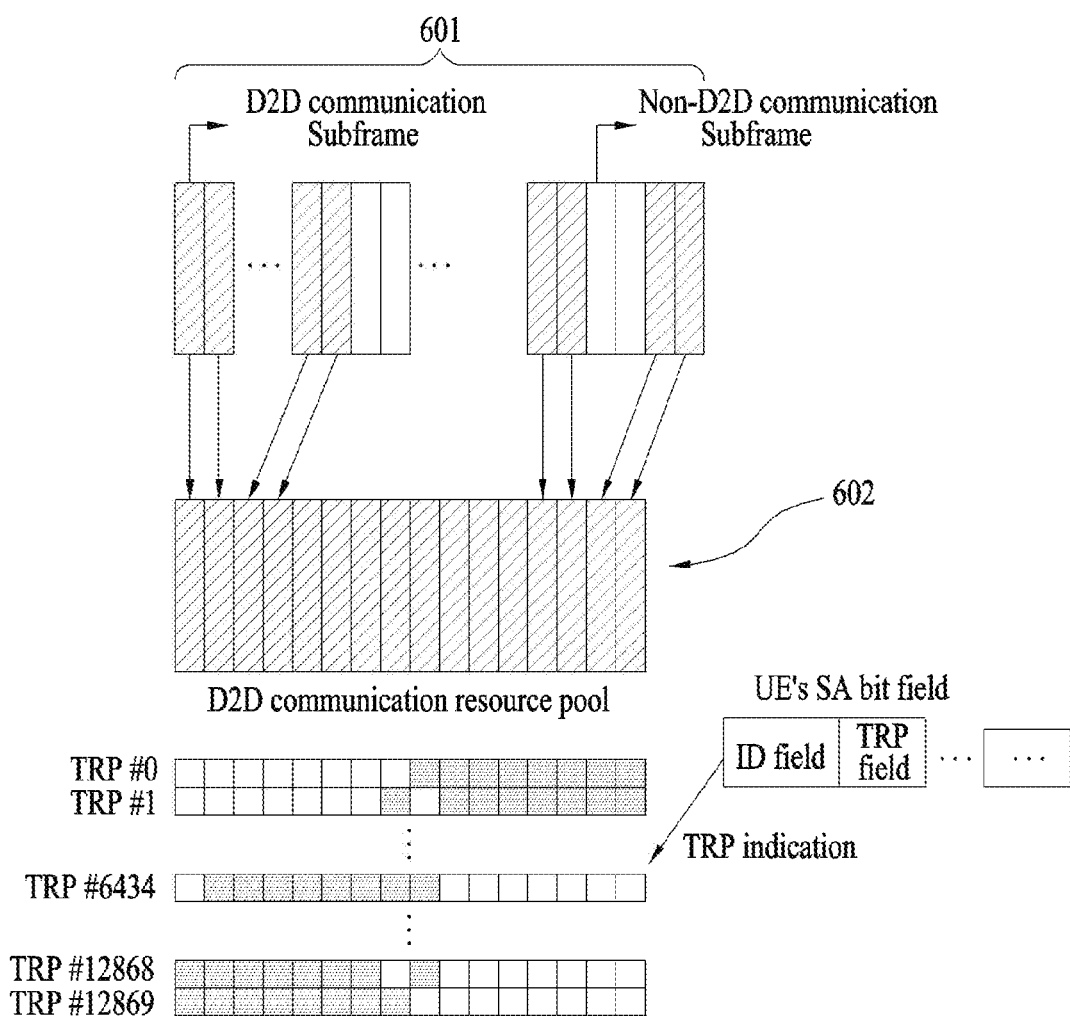
FIG. 6 illustrates a time resource pattern according to an embodiment of the present invention.

FIG. 6 illustrates TRPs according to an embodiment of the present invention. Referring to FIG. 6, a plurality of subframes 601 may include subframes available for D2D signal transmission and reception (e.g., UL subframes in TDD, and D2D communication subframes in FIG. 6) and subframes unavailable for D2D signal transmission and reception (non-D2D communication subframes in FIG. 6). The plurality of subframes 601 may be included within a D2D control information transmission period (e.g., a physical sidelink control channel). A subframe pool 602 for data transmission may be determined, which includes only D2D communication subframes from among the plurality of subframes 601.

As TRPs (TRP #0, #1, . . . ) are applied to the subframe pool 602 for data transmission, a set of subframes to transmit D2D data may be determined. For example, if TRP #1 is applied to the subframe pool 602 for data transmission, an 8th subframe and 10th to 16th subframes may be included in a subframe set, for D2D data transmission. Shaded parts of the TRPs in FIG. 16 may indicate subframes that will carry D2D data. A TRP may be a bitmap having bits corresponding to the respective subframes of a subframe pool for data transmission. If a bit of the bitmap is set to 1, the bit may indicate a subframe to transmit D2D data. Specifically, if a TRP is configured to be a bitmap, the shaded parts of the TRP may be 1s and the non-shaded parts of the TRP may be 0s in FIG. 6. For example, TRP #1 is a bitmap of {0, 0, 0, 0, 0, 0, 0, 1, 0, 1, 1, 1, 1, 1, 1, 1}.

Once a subframe set is determined for transmission of D2D data, the D2D data may be transmitted in the subframe set. Upon receipt of an SA, a UE may detect and decode a D2D signal in corresponding subframes, expecting transmission of the D2D signal in the subframes.

In the above description, a Transport Block (TB) for D2D data may be transmitted in a predetermined number of subframes in a subframe set. That is, the number of repetitions/a retransmission number/the number of retransmissions may be predetermined for each TB. For example, the number of retransmissions per TB may be fixed to 4.

The above-described plurality of subframes may be contiguous subframes following D2D control information-related subframes (including UL subframes that may carry D2D control information, DL subframes with no relation to the UL subframes, and special subframes in TDD) in one D2D control information period (i.e., one SA period). The D2D control information (an SA, an MCS, resource allocation information, a TRP, etc.) may be transmitted in subframes determined to transmit D2D control information (i.e., a subframe pool (for D2D control information)) from among subframes available for transmission of D2D control information according to an SA subframe bitmap. In this case, information indicating a TRP in a subframe next to the subframe pool for D2D control information may be transmitted in the D2D control information. If one SA period is configured as described above, subframes included in a subframe pool for data transmission are not overlapped with subframes included in a subframe pool for D2D control information. More specifically, if the subframe pool for D2D control information is overlapped with the subframe pool for D2D data transmission, it may be regulated that D2D control information or D2D data is always transmitted and the D2D control information and the D2D data are not transmitted in the same subframe.

Meanwhile, the subframe pool for data transmission may not be defined separately in D2D communication mode 1. In this case, UL subframes following the subframe pool for D2D control information transmission (specifically, a subframe pool including the first subframe of a subframe bitmap for D2D control information transmission to a subframe corresponding to the last 1 of the bitmap) may be a subframe pool for implicit mode 1 D2D data transmission.

Application of TRP

In the foregoing description, a TRP may be applied to subframes as follows.

A UE may determine a subframe indicator bitmap corresponding to TRP indication information. If the UE is a D2D control information transmitter, the TRP indication information may be transmitted in D2D control information. If the UE is a D2D control information receiver, the TRP indication information may be included in received D2D control information. Herein, the TRP indication information may be described in a later-described TRP indication part or may be an index indicating a specific subframe indicator bitmap. For example, if the size of the subframe indicator bitmap is 8, there may be a set of available bitmaps. An index may be assigned to each bitmap included in the bitmap set and a subframe indicator bitmap may be determined by such as index.

A bitmap to be applied to a subframe pool for data transmission may be determined from the subframe indicator bitmap. The subframe indicator bitmap may be smaller than the subframe pool for data transmission in size. In this case, the subframe indicator bitmap (e.g., a TRP indication bit sequence) may be repeated. If the length of the TRP indication bit sequence is M, the M-bit sequence is simply repeated and filled in the remaining L subframes. If L is not a multiple of M, a TRP may be generated by sequentially filling the remaining bit sequence in the L subframes.

That is, if the subframe indicator bitmap is smaller in size than the subframe pool for data transmission, the subframe indicator bitmap may be repeated within the bitmap for the subframe pool for data transmission.

For example, if the size M of the subframe indicator bitmap is smaller than the number of subframes in the resource pool for data transmission and the UE transmits D2D data in the first subframe of the subframe pool for data transmission, the UE may transmit D2D data in a (1+M)th subframe of the subframe pool. Or a first bit value of the bitmap (to be applied to the subframe pool for data transmission) may be equal to a (subframe indicator bitmap size+1)th bit value.

If the size of the subframe pool for data transmission is not a multiple of the size of the subframe indicator bitmap, the bits of the last repeated subframe indicator bitmap may be used sequentially. In other words, if the size of the subframe pool for data transmission is not a multiple of the size of the subframe indicator bitmap, the last repeated subframe indicator bitmap may be truncated. Specifically, if the subframe indicator bitmap is 16 bits {0, 0, 0, 0, 0, 0, 0, 1, 0, 1, 1, 1, 1, 1, 1, 1} and the subframe pool includes 36 subframes, the bitmap (to be applied to a subframe pool for data transmission) is configured by repeating the subframe indicator bitmap twice and using the first 4 bits of the subframe indicator bitmap sequentially at the third repetition (while truncating the remaining bits). That is, the bitmap (to be applied to the subframe pool for data transmission) is {0, 0, 0, 0, 0, 0, 0, 1, 0, 1, 1, 1, 1, 1, 1, 1, 0, 0, 0, 0, 0, 0, 0, 1, 0, 1, 1, 1, 1, 1, 1, 1, 0, 0, 0, 0}.

Indication of TRP

Now, a description will be given of a method for indicating the above-described TRP.

First, an eNB may indicate an ID and TRP bits included and transmitted in an SA by a D2D SA grant in mode 1. The ID sequence included in the SA and/or the sequence of a TRP bit field included in the SA (a bit field indicating a specific ID and/or a TRP) may be explicitly included in the D2D SA grant. Or the ID sequence to be transmitted in the SA and/or the TRP bit field to be transmitted in the SA may be generated by hashing the bit sequence of a D2D-RNTI or using partial bits (e.g., lower N bits) of the bit sequence of the D2D-RNTI. Because an RNTI is different for each UE and at least a part of the RNTI is used, the position of D2D resources may be configured for each UE without additional signaling. A D2D-RNTI is an ID pre-signaled to distinguish D2D control information from other control information and is used for masking the CRC of the D2D control information. A part of the ID included and transmitted in the SA may be generated from the RNTI and the remaining part of the ID may be generated based on a target ID (or a group ID). Or the ID may be generated by combining (e.g., AND/XOR/OR-operating) both the RNTI and the target or group ID. The ID included and transmitted in the SA may be changed over time. Characteristically, only a Transmission (Tx) UE ID may be changed. This is because if up to a target UE ID part is hopped and a target UE is not aware of the hopping, the target UE may not detect the ID. If the target UE is aware of even a hopping pattern of the target UE ID part, every ID sequence included in the SA may be hopped in a predetermined rule. The changeability (hopping) of the ID sequence over time may be implemented by directly setting a different bit field in a D2D SA grant by the eNB and the ID sequence may be changed in a predetermined rule after the D2D SA grant of the eNB. For example, the ID sequence included in the D2D SA grant may be used as an initialization parameter for a random sequence and a time-variant sequence may be generated using a random sequence created using the initialization parameter.

Second, an ID may be transmitted in an SA and a TRP may be determined using the ID in mode 2. The ID may be a short ID induced from an ID (a transmission and/or reception (target or group) ID) by a higher layer or a bit sequence used to configure the transmission position of data and a scrambling parameter. If the ID included in the SA is too short for creation of TRP candidates, the probability of collision between IDs is increased. In this case, a plurality of Tx UEs are likely to use the same TRP. To prevent this, a part of the bits of the SA may include bits indicating a TRP. Also, a specific TRP may be indicated by combining an ID bit field and bits of a TRP field in the SA. For example, the ID included in the SA may be used to indicate a TRP set and TRP indication bits included in the SA may indicate a specific index within the TRP set. In another example, the TRP bits included in the SA may indicate a specific TRP set within a resource pool and the ID included in the SA may indicate a specific TRP within the pool/set indicated by the TRP bits. In this case, the bits indicating a TRP set may be transmitted semi-statically without being transmitted in every SA. For example, the bits indicating a TRP set may be used as a virtual CRC on the assumption that the bits are transmitted in every nth SA or even though the bits are transmitted in every SA, they are not changed over n SA transmissions. Meanwhile, these TRP bits are not included additionally. Rather, the TRP bits may be transmitted by borrowing an unused state of MCS bits or any other SA bit field. Or a TRP pattern may be indicated by using all unused states of additionally included bits and other bit fields.

Meanwhile, the size of TRP bits used in an indication of an SA may be changed according to the size of a D2D UE group or the number of Tx UEs in the group. For example, if a specific police officer group includes N police officers, the number of TRP indication bits is set to log 2(N). Herein, the remaining unused bits may be used for other purposes or may be set to 0s for use as a virtual CRC.

Meanwhile, an ID may be set differently for a TRP in mode 1 and mode 2. For example, while a TRP may be indicated using only a Tx UE ID in mode 1, a TRP may be indicated using both a Tx UE ID and a target UE ID (group ID) in mode 2.

To configure a TRP, the following information may be used: i) information about the size of a transmission opportunity from the viewpoint of a UE (this information indicates how many resources are allocated to one UE by one SA); and ii) information about the number of retransmissions for each TB (this information may be information about the number of TBs transmitted during one SA period. In this case, the number of retransmissions for each TB may be calculated by flooring the size (number) of transmission opportunities during one SA period/the number of TBs transmitted by one SA. Or this information may be information about the (maximum) number of repetitions for each TB). Part of the information may be preset or configured by the network. The information may be preset for an out-of-coverage UE or signaled to the out-of-coverage UE from another UE within the network by a physical-layer signal or a higher-layer signal. In addition, part of the information may be included and transmitted in an SA. For example, the transmission opportunity size may be preset or configured by the network. Herein, a retransmission number for each TB may be included and transmitted in the SA. On the other hand, information about the transmission opportunity size may be included and transmitted in the SA and information about the retransmission number may be preset or semi-statically indicated in a higher-layer signal by the network.

In a specific example, if an SA includes an 8-bit ID, the number of TRPs distinguishable by IDs is 256 (=2^8). If a mode-2 resource pool includes 16 subframes and a transmission opportunity size is 8, the number of TRPs that can be generated is 12870 (=16C8). Therefore, it is impossible to identify a TRP only by the ID bits included in the SA. To avoid this problem, additional bits may be included in the SA in order to indicate a TRP in the above-described method. In this case, about 6 additional bits are needed to distinguish all TRPs that can be produced. The additional bits may be available from a combination of unused MCS states and a new bit field or from an additional bit field.

Signaling of TRP subset

A network may signal TRP subset configuration through a higher-layer signal (e.g. Radio Resource Control (RRC) signal). More specifically, as described above, a UE may determine a bitmap which is to be applied to a subframe pool for data transmission using information indicating a TRP and transmit D2D data in a subframe indicated by the bitmap. In this case, if an RRC information element relating to a TRP subset is configured for the UE, a set of bitmaps that can be indicated by the information indicating the TRP may be a subset of the set of the bitmaps that can be indicated by the information indicating the TRP in the case in which the UE is irrelevant to the RRC information element relating to the TRP subset. The information indicating the TRP is an index indicating any one bitmap out of the set of the bitmaps.

The above description will now be given in more detail with reference to Table 1 shown below. Table 1 defines the relationship between information $I_{TRP}$ indicating a TRP and a bitmap corresponding to the information indicating the TRP when the size of a subframe indication bitmap relating to the TRP is 6. For example, if the information $I_{TRP}$ indicating the TRP is 22, the subframe indication bitmap is $\{0, 1, 1, 0, 1, 0\}$.

TABLE 1

| $I_{TRP}$ | $k_{TRP}$ | $(b_0', b_1', b_{N_{TRP}-1}')$ |
|---|---|---|
| 0 | reserved | reserved |
| 1 | 1 | (1, 0, 0, 0, 0, 0) |
| 2 | 1 | (0, 1, 0, 0, 0, 0) |
| 3 | 2 | (1, 1, 0, 0, 0, 0) |
| 4 | 1 | (0, 0, 1, 0, 0, 0) |
| 5 | 2 | (1, 0, 1, 0, 0, 0) |
| 6 | 2 | (0, 1, 1, 0, 0, 0) |
| 7 | 3 | (1, 1, 1, 0, 0, 0) |
| 8 | 1 | (0, 0, 0, 1, 0, 0) |
| 9 | 2 | (1, 0, 0, 1, 0, 0) |
| 10 | 2 | (0, 1, 0, 1, 0, 0) |
| 11 | 3 | (1, 1, 0, 1, 0, 0) |
| 12 | 2 | (0, 0, 1, 1, 0, 0) |
| 13 | 3 | (1, 0, 1, 1, 0, 0) |
| 14 | 3 | (0, 1, 1, 1, 0, 0) |
| 15 | 4 | (1, 1, 1, 1, 0, 0) |
| 16 | 1 | (0, 0, 0, 0, 1, 0) |
| 17 | 2 | (1, 0, 0, 0, 1, 0) |
| 18 | 2 | (0, 1, 0, 0, 1, 0) |
| 19 | 3 | (1, 1, 0, 0, 1, 0) |
| 20 | 2 | (0, 0, 1, 0, 1, 0) |
| 21 | 3 | (1, 0, 1, 0, 1, 0) |
| 22 | 3 | (0, 1, 1, 0, 1, 0) |
| 23 | 4 | (1, 1, 1, 0, 1, 0) |
| 24 | 2 | (0, 0, 0, 1, 1, 0) |
| 25 | 3 | (1, 0, 0, 1, 1, 0) |
| 26 | 3 | (0, 1, 0, 1, 1, 0) |
| 27 | 4 | (1, 1, 0, 1, 1, 0) |
| 28 | 3 | (0, 0, 1, 1, 1, 0) |
| 29 | 4 | (1, 0, 1, 1, 1, 0) |
| 30 | 4 | (0, 1, 1, 1, 1, 0) |
| 31 | 5 | (1, 1, 1, 1, 1, 0) |
| 32 | 1 | (0, 0, 0, 0, 0, 1) |
| 33 | 2 | (1, 0, 0, 0, 0, 1) |
| 34 | 2 | (0, 1, 0, 0, 0, 1) |
| 35 | 3 | (1, 1, 0, 0, 0, 1) |
| 36 | 2 | (0, 0, 1, 0, 0, 1) |
| 37 | 3 | (1, 0, 1, 0, 0, 1) |
| 38 | 3 | (0, 1, 1, 0, 0, 1) |
| 39 | 4 | (1, 1, 1, 0, 0, 1) |
| 40 | 2 | (0, 0, 0, 1, 0, 1) |
| 41 | 3 | (1, 0, 0, 1, 0, 1) |
| 42 | 3 | (0, 1, 0, 1, 0, 1) |
| 43 | 4 | (1, 1, 0, 1, 0, 1) |
| 44 | 3 | (0, 0, 1, 1, 0, 1) |
| 45 | 4 | (1, 0, 1, 1, 0, 1) |
| 46 | 4 | (0, 1, 1, 1, 0, 1) |
| 47 | 5 | (1, 1, 1, 1, 0, 1) |
| 48 | 2 | (0, 0, 0, 0, 1, 1) |
| 49 | 3 | (1, 0, 0, 0, 1, 1) |
| 50 | 3 | (0, 1, 0, 0, 1, 1) |
| 51 | 4 | (1, 1, 0, 0, 1, 1) |
| 52 | 3 | (0, 0, 1, 0, 1, 1) |
| 53 | 4 | (1, 0, 1, 0, 1, 1) |

TABLE 1-continued

| $I_{TRP}$ | $k_{TRP}$ | $(b_0', b_1', b_{N_{TRP}-1}')$ |
|---|---|---|
| 54 | 4 | (0, 1, 1, 0, 1, 1) |
| 55 | 5 | (1, 1, 1, 0, 1, 1) |
| 56 | 3 | (0, 0, 0, 1, 1, 1) |
| 57 | 4 | (1, 0, 0, 1, 1, 1) |
| 58 | 4 | (0, 1, 0, 1, 1, 1) |
| 59 | 5 | (1, 1, 0, 1, 1, 1) |
| 60 | 4 | (0, 0, 1, 1, 1, 1) |
| 61 | 5 | (1, 0, 1, 1, 1, 1) |
| 62 | 5 | (0, 1, 1, 1, 1, 1) |
| 63 | 6 | (1, 1, 1, 1, 1, 1) |
| 64-127 | reserved | reserved |

Table 1 shown above may be referred to as a mother bitmap set capable of being used when there is no additional RRC signaling. In this case, the RRC information element relating to the TRP subset may be configured for the UE and may restrict a set usable as an index in Table 1. For example, when $k_{TRP}$ usable by the UE is up to 4, if the RRC information element relating to the TRP subset is {1, 1, 1, 0}, a set of bitmaps corresponding to $k_{TRP}$ of 1, 2, and 3 in Table 1 may be a subset of the mother bitmap set. That is, if an information element relating to an RRC-signaled TRP subset is configured, a set of bitmaps usable by the UE or a set of information indicating the TRP is a subset of a set of the bitmaps or a subset of a set of the information indicating the TRP when the UE is irrelevant to the RRC information element relating to the TRP subset (when the RRC information element is not signaled or when the RRC information element is signaled but is not configured).

The RRC information element relating to the TRP subset may be for the UE of transmission mode 2.

Restriction of the TRP subset by the network may be particularly effective when the UE determines transmission resources as in mode 2. When the UE randomly selects a TRP index from the TRP, if a small number of neighbor UEs is present so that there is less interference, $k_{TRP}$ of a large value is selected to rapidly transmit packet and, if a large number of neighbor UEs is present so that there is much interference, a subset is limited to $k_{TRP}$ of a relatively small value in order to solve problems of in-band emission and half duplex, thereby preventing a specific UE from continuously generating much interference.

Meanwhile, while restriction of the TRP subset may be implemented by restricting the value of $k_{TRP}$, it may also be implemented by restricting a specific TRP index. For example, signaling may be performed such that a specific UE or a specific UE group may use a specific $I_{TRP}$ set. Although this method requires more signaling bits than the case of restricting the subset by signaling the value of $k_{TRP}$, it is possible to flexibly restrict the TRP subset. In addition, this method may be used to enable a specific UE or UE group and another UE or UE group to use different subframes in the time domain. For instance, a TRP subset may be configured such that a UE group A transmits packets in all or a part of front four subframes in a TRP bitmap and a TRP subset may be configured such that a UE group B transmits packets in all or a part of back four subframes in the TRP bitmap.

Bit Sequence Generation for TRP
Method 1

A TRP indication bit sequence included in an SA may be used as a simple bitmap of a subframe in which a D2D signal is to be transmitted among subframes after SA transmission. For example, in this method, a location at which a bit is 1 means a subframe index in which a D2D signal Tx UE is to transmit (is likely to transmit) a D2D signal.

Figure 7:
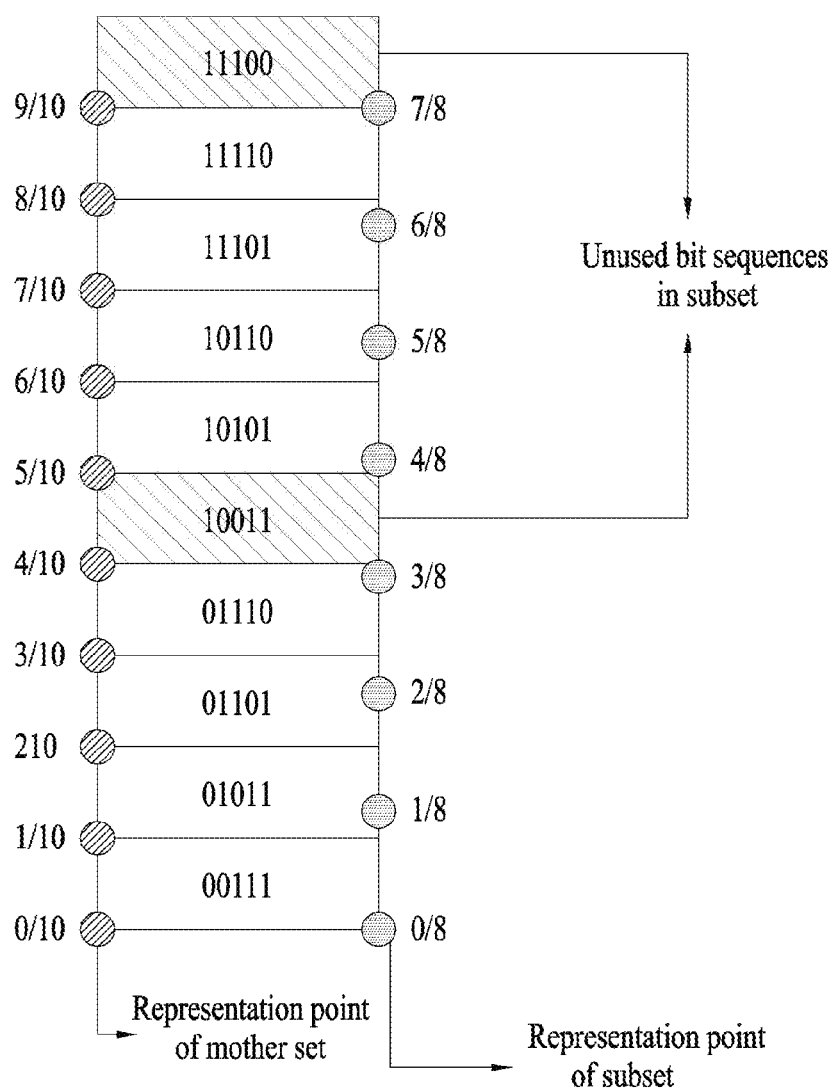

Meanwhile, consider usage of the TRP indication bit sequence when an SA transmission period (in more detail, the number of D2D subframes configured between SA transmission intervals) is different from the length of the TRP indication bit sequence. As illustrated in FIG. 7, when L D2D subframes are present between SA transmission periods and the number of bits for indicating a TRP is M (where M≤L), how to indicate a transmission pattern in the other (L-M) subframes is proposed.

Method 2a

If the length of the TRP indication bit sequence is M, the M-bit sequence is simply repeated and fills the remaining L subframes. If L is not a multiple of M, a TRP is generated by sequentially filling the remaining bit sequence in the L subframes.

Method 2b

If the length of the TRP indication bit sequence is M, the TRP indication bit sequence represents a bitmap of the first M subframes and a bitmap of the next subframes is filled by hopping from the bitmap of the first M subframes to another TRP indication bit sequence, thereby generating a TRP for L subframes. In more detail, if the TRP indication bit sequence is pre-indexed and the TRP indication bit sequence for the first M subframes is indicated through an SA, a TRP for the other D2D subframes is generated by a predetermined index hopping pattern in the other (L-M) subframes. As compared with Method 2a, the TRP hops over time rather than simple repetition. Therefore, additional diversity gain may be obtained or collision may be randomized.

The principle of Methods 2a and 2b described above may be identically extended not only to the case in which the TRP is indicated simply by a bitmap but also to Method 3, which is to be described below, when the SA transmission period is different from the number of subframes indicated by the TRP indication bit sequence. Even if the TRP indication bit sequence is not a simple bitmap, when the length M of D2D subframes indicated by the TRP indication bit sequence is less than a subframe interval L at which the SA is transmitted (in more detail, the number of D2D subframes between SA transmission periods), Method 2a/2b may be applied in order to generate a TRP for the other (L-M) subframes.

Method 3

If the sizes of transmission opportunities of all UEs are equally M and the number of subframes of a D2D pool is N as in the embodiment of FIG. 6, a bit sequence may be generated by a code generation scheme called M-out-of-N coding [TENKASI V. RAMABADRAN, A coding scheme for m-out-of-n codes, IEEE Trans. On communications, Vol. 38, No. 8m August 1990]. An M-out-of-N code simply means a code in which only M bits among N binary codeword bits are set to 1s and the other bits are set to 0s. This code generates the same codeword having a Hamming weight of M for all codewords. In the present invention, the M-out-of-N code may be used as a bit sequence of a TRP. A TRP set of weight M is indicated by $\{\beta_0, \beta_1, \ldots, \beta_{K-1}\}$, wherein $\beta_r$ indicates an r-th TRP sequence, and may be represented as a length-N binary bit sequence. In this case, $$K = \binom{N}{M} = \frac{N!}{M!(N-M)!}.$$

For example, locations of 1s in the M-out-of-N code indicate locations at which data is transmitted and locations of 0s in the M-out-of-N code indicate that no data is transmitted. If respective bit sequences are mapped to subframe indexes of a D2D resource pool in one-to-one correspondence, all locations of 1s are used to indicate subframes in the resource pool and, if groups of subframe indexes are mapped to 1s of a TRP in one-to-one correspondence, locations of 1s are used to indicate subframe group indexes in the resource pool. For example, if subframes are bundled and a D2D signal is transmitted in the bundled subframes, the bundled subframes may be interpreted as 1s of a bit sequence.

If N=4 and M=2, the following TRP set may be represented as a codeword of the M-out-of-N code.

TRP set={0011, 0101, 0110, 1001, 1010, 1100}

As another example, if N=5 and M=3, a TRP set may be as follows.

TRP set={00111, 01011, 01101, 01110, 10011, 10101, 10110, 11001, 11010, 11100}

In some cases, only K1 TRP set indexes may be used among K TRP set indexes. This case may occur when the size of a TRP bit field (including an ID field) contained in an SA cannot represent all TRP sets. Then, a scheme of selecting the K1 TRP set indexes among the K TRP sets is needed. For convenience of description, an original codeword set of the M-out-of-N code is referred to as a TRP mother set. A bit sequence of the mother set $$\left\{\beta_0, \beta_1, \ldots, \beta_{\binom{N}{M}-1}\right\}$$

may be indexed through Equation 1 indicated below. $\beta_r$ denotes an r-th TRP sequence.

$$r = \sum_{i=0}^{M-1} \binom{N-s_i}{M-i}$$ [Equation 1]

(where the set $\{s_i\}_{i=0}^{M-1}$, ($1 \le s_i \le N$, $s_i < s_{i+1}$) contains sorted indices for 1's positions in $\beta_r$ and $$\binom{x}{y} = \begin{cases} \binom{x}{y} & x \ge y \\ 0 & x < y \end{cases}$$

is the extended binomial coefficient, resulting in unique label $$r \in \left\{0, \ldots, \binom{N}{M}-1\right\}$$

This indexing scheme may be interpreted as indexing in order of small size when each bit sequence in the mother set is converted into a decimal. However, this is for convenience of description and the concept of the present invention may be applied even when indexing is performed in a reverse order of the above case. It is important to index each bit sequence such that variation in a Hamming distance between two sequences is minimized. This serves to correspondingly increase a Hamming distance if an index difference is increased upon selecting a subset from a mother set at a regular interval.

Another scheme of indexing the mother set may use a gray coding scheme. A detailed indexing scheme is as follows.

A scheme of generating a length-N gray code is indicated in Equation 2.

$$L_0 = \{0, 1\}$$ [Equation 2]
$$L_1 = \{0L_0, 1\overline{L_0}\}$$
$$\vdots$$
$$L_N = \{0L_{N-1}, 1\overline{L_{N-1}}\}$$

where $L_i$ denotes a length-i gray code set, $\overline{L_{i-1}}$ denotes reverse of a code of an (i−1)-th set, $0L_{N-1}$ denotes a length-N code generated by attaching 0 to a first location of each code of an (N−1)-th set, and $1\overline{L_{N-1}}$ denotes a length-N code generated by attaching 1 to a first place of reverse of each code of an (N−1)-th set.

After generating the gray code, codes having weight M in the gray code are selected and indexed in order, thereby generating a gray code based constant weight code.

The gray code based constant weight code may be used as a TRP mother set.

As another implementation scheme, an indexing order may be set in a sequence selection order described below. If the indexing order is the sequence selection order, K1 TRP subsets may be selected in an index order.

As a scheme of selecting K1(≤K) indexes from a mother set, the following methods are proposed.

Method 3-1

Subset configuration may be signaled by a network through a higher-layer (e.g., RRC) signal or a preconfigured subset may be used. K1 set indexes may be transmitted to a D2D UE through the higher-layer signal or may be preconfigured. In this case, it is assumed that the preconfigured set indexes are defined according to N and M. As the simplest method, a TRP bitmap usable in N D2D subframes may be pre-signaled through a higher-layer signal such as an RRC signal. However, since this method causes inefficiency of signaling, if signaling is performed by a method of indexing a bit sequence having a transmission opportunity size of M in N subframes, the number of signaling bits can be reduced.

Method 3-2

A subset is generated by selecting K1 bit sequences in an indexed order from a mother set. Although this method is the simplest, there are disadvantages in that locations of 1s are concentrated at the back or front part of the bit sequence.

Method 3-3

The optimal TRP subset serves to select the TRP subset such that a minimum Hamming distance between bit sequences is maximized (or maximum correlation between bit sequences is minimized). Alternatively, the TRP subset should be selected such that locations of 1s are evenly distributed per TRP. If the TRP subset is selected at an equal interval from a mother set, the locations of 1s are evenly distributed in the entire TRP subset. However, a subset size K1 is not a divisor of K corresponding to the mother set size, a rule of selecting an equal interval is ambiguous. To select an index of an equal interval, the following rule may be used.

If existing mother set indexes 0, 1, . . . , K−1 are divided by K, then K representative points 0/K, 1/K, . . . , K−1/K may be obtained. Similarly, if indexes of a TRP subset are divided by the set size, then 0/K1, 1/K1, . . . , (K1−1)/K1 may be obtained. If a j-th representative point of the TRP subset is located between an i-th representative point and an (i+1)-th representative point of a mother set, that is, if (i−1)/K≤(j−1)/K1<i/K, a j-th bit sequence of the TRP subset uses an i-th bit sequence of the mother set.

In other words, the above rule may be represented as selecting an index $$\left\lfloor \frac{K}{K1}i \right\rfloor, i \in \{0, \ldots, K1-1\}$$

from the mother set.

The above-mentioned principle is a method of selecting subsets from the mother set separately from each other at as an equal interval as possible.

Let us explain the case in which N=5 and M=3 given this rule. In this case, for K1=8, 8 sequences should be selected from the mother set (K=10). FIG. 7 shows where a representative point of a TRP set is located between representative points of a mother set. Since an interval between representative points of the TRP set is wider than an interval between representative points of the mother set (K≥K1), probability of selecting the same bit sequence from the TRP set is 0. Table 2 shows a bit sequence finally selected by the above proposed method.

TABLE 2

| Index | Bit sequence |
|-------|--------------|
| 0     | 00111        |
| 1     | 01011        |
| 2     | 01101        |
| 3     | 01110        |
| 4     | 10101        |
| 5     | 10110        |
| 6     | 11001        |
| 7     | 11010        |

According to the above rule, the following modification may be considered.

As modification 1, a predetermined offset α may be applied upon selecting a subset. In more detail, while bit sequences are selected from a mother set at an equal interval, the predetermined offset is applied. The range of an offset value is 0 to floor(K/K1)−1 and the offset value may be a preset value. Alternatively, the offset value is configurable by an eNB or another UE. For example, the eNB may command a specific UE or a specific UE group to use a specific offset value. Alternatively, the offset value may be linked with a synchronization source ID so that synchronization groups use different TRPs. As another example, a synchronization source ID and/or a hop count may be linked so that different hops use different TRPs.

For example, when K=20 and K1=4, an offset of 0, 1, 2, 3, and 4 may be considered. If the offset is 0, a TRP subset is {0, 5, 10, 15} and, if the offset 1, the TRP subset is {1, 6, 11, 16}.

In modification 1, as an embodiment of indicating the offset by another UE, the offset may be derived by an ID included in an SA of a Tx UE. More specifically, since a constant (or constant+

$$\left\lfloor \frac{K}{K1}i \right\rfloor$$

K1) derived by the ID may exceed the range of K, a modulo function in which a constant is added may be taken as indicated by Equation 3.

$$\left(Y(ID) + \left\lfloor \frac{i \cdot K}{K1} \right\rfloor\right) \bmod K, i \in \{0, \ldots, K1-1\} \quad \text{[Equation 3]}$$

The above equation is obtained by applying the offset α in the form of Y(ID)mod K=α in the equation of Modification 1 and the principle of the method is identical. In the above equation, Y may be a value derived by an ID included in the SA. Y may be a specific fixed constant linked with the ID or may be a constant value generated by an ID used as a seed value of a random sequence generator. If the ID is used as the seed value of the random sequence generator, Y may be changed in every SA transmission or at every specific SA transmission period. Alternatively, Y may be changed according to a radio frame (or subframe) number or a D2D frame (or subframe) number in which the SA is transmitted regardless of an SA transmission period. The above method serves to determine a start index by the ID at a total combination number (mother set size) K and to select a TRP based on the start index at an equal interval. The start index is linked with the ID and may be variable or fixed over time.

As an additional modification, Equation 4 may be considered.

$$L\left(Y(ID) + \left\lfloor \frac{i \cdot K}{L \cdot K1} \right\rfloor\right) \bmod \lfloor K/L \rfloor, i \in \{0, \ldots, K1-1\} \quad \text{[Equation 4]}$$

Upon selecting the TRP, as an index i increases by 1, a minimum interval of selected TRP subset indexes is set to L or more. In this case, L may be preconfigured or may be signaled through a physical layer or higher-layer signal by the eNB or through a physical layer or higher-layer signal by a Tx UE or another UE (e.g., a synchronization source UE or a group head UE).

As another method, Equation 5 may be considered.

$$\left(Y(ID) + \left\lfloor \frac{i \cdot K}{A} \right\rfloor\right) \bmod K, i \in \{0, \ldots, K1-1\} \quad \text{[Equation 5]}$$

This method serves to select an index interval as K/A and a subset is selected always as a fixed interval regardless of the number of bits that can be indicated by a TRP in an SA. In this case, A may be preconfigured or may be signaled through a physical layer or higher-layer signal by the eNB or may be indicated by a Tx UE or another UE.

As Modification 2, Equation 6 may be used.

$$\left\lceil \frac{K}{K1}i \right\rceil + \alpha, i \in \{0, \ldots, K1-1\} \quad \text{[Equation 6]}$$

That is, a ceiling function may be used instead of a floor function. An offset may be applied as in the above example.

As Modification 3, when a Hamming weight is N/2, the first and last indexes among the above-proposed mother set indexes always have the greatest Hamming distance. Accordingly, as a method for always including the first and last indexes, Equation 7 may be used.

$$\left\lfloor \frac{K-1}{K1-1} i \right\rfloor, i \in \{0, \ldots, K1-1\} \qquad \text{[Equation 7]}$$

Meanwhile, upon determining a specific TRP, the specific TRP may be determined based on an ID included in an SA and on a TRP bit field. If the ID is unchangeable and the TRP bit field is capable of being easily configured by a Tx UE, a TRP set may be grouped based on each bit field. Hereinbelow, a grouping-based TRP indication method will be proposed.

If the length of the ID included in the SA is N and the size of the TRP set is K1, TRPs may be grouped in order. A TRP indication bit included in the SA may be used to indicate to which group a TRP of a specific UE belongs. In this case, an ID field is used to indicate which TRP is used in a group. That is, by indicating as different a TRP as possible through a TRP indication bit, if collision occurs due to some reasons and a UE cannot correctly transmit a packet, TRP bits are configured as differently as possible to select different resources. This embodiment is illustrated in FIG. 8(*a*).

Figure 8:
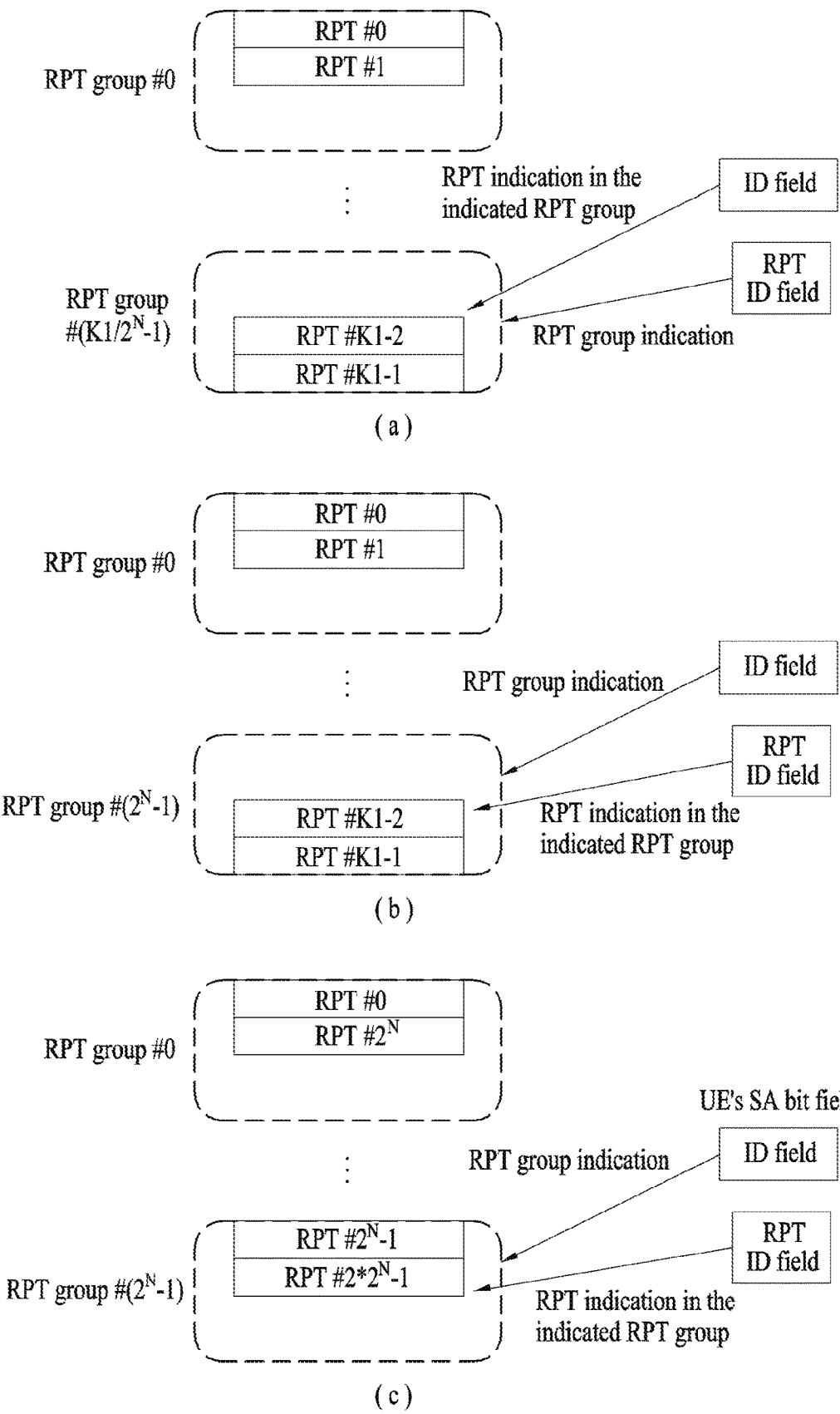

As illustrated in FIG. 8(*b*), if the length of the ID included in the SA is N, the ID may be used to designate a TRP group and a bit sequence of the TRP field may be used to indicate a specific TRP in a TRP group. Alternatively, as illustrated in FIG. 8(*c*), if the length of the ID included in the SA is N, the ID may be used to designate a TRP group and the bit sequence of the TRP field may be used to indicate a specific TRP in a TRP group. In order to select TRPs separated as far as possible only by a TRP bit, the TRPs separated as far as possible may form one group in a grouping process. As an embodiment, when an N-bit ID is transmitted in the SA and an L-bit TRP is transmitted, the size of a TRP set becomes $2^{L+N}$. In this case, TRPs in one group form one group by collecting TRPs separated at an interval of $2^N$ and the group is indicated using the ID transmitted in the SA. Next, a specific TRP is indicated using the TRP bits included in the SA.

Meanwhile, a subframe indicated by a TRP indication bit sequence may be a normal subframe without distinguishing between a D2D subframe and a non-D2D subframe. If the D2D subframe is indicated by other signals, an index of a subframe in which a D2D signal is actually to be transmitted may be indicated through a logical AND operation of a D2D subframe indication bit and the RPT indication bit sequence.

Method 4

As a cyclic shift based TRP generation method, different TRPs may be generated by cyclically shifting a seed TRP. For example, a TRP having M1 consecutive locations of 1s may become the seed TRP. When D2D signals are consecutively transmitted, since a gap between D2D signal transmissions is not needed, the number of available REs increases, and thus a coding rate may be lowered. Upon generating the seed TRP using consecutive 1s, the first location of 1 may be predetermined or may be indicated through a physical layer or a higher-layer signal by a network. As example of TRP0 when the first location of 1 is 0 is indicated in Equation 8.

$$RPT_0^{Seed} = [\underbrace{1, \ldots, 1}_{M1}, \underbrace{0, \ldots, 0}_{N1-M1}] \qquad \text{[Equation 8]}$$

The seed TRP may have a predetermined pattern or may have a specific pattern signaled to a specific UE or a specific UE group. For example, the seed TRP may be configured in linkage with a synchronization source ID or in linkage with a cell ID or a virtual cell ID. As another example, the seed TRP may be generated by a specific group ID or a target ID. For instance, upon generating the seed TRP using the group ID, the seed TRP may be generated by one of the methods proposed in Method 3. For example, indexes are generated as in Equation 1 with respect to given N and M and one index is selected by performing modulo operation on the group ID or using a specific bit of the group ID. As another example, the seed TRP may be generated by a Tx UE ID. Tx UEs may have different seeds and thus different UEs are prevented from using the same TRP upon performing TRP hopping based on the seed TRP, which will be described later.

If the seed TRP is generated by the above-mentioned method, TRPs are generated by cyclic-shifting the seed TRP by G. For example, a zeroth TRP is the seed TRP and the first TRP is generated by cyclic-shifting the zeroth TRP by G. In this way, an i-th TRP is generated by cyclic-shifting an (i−1)-th TRP by G.

Although the size of cyclic shift between TRPs may be predetermined as the specific value G, it may be a value obtained by performing modulo operation using a specific random sequence. A sequence of the value G may be hopped between TRPs with a predetermined rule. Although a specific TRP index may be signaled through a TRP indication bit sequence in an SA, it may be signaled by directly indicating a Cyclic Shift (CS) value by the seed TRP.

The number of transmissions may differ according to a UE. For this, a value M1 may be signaled through the SA.

As an embodiment, when N=8, M=4, and G=1, a TRP indicated in Equation 9 may be generated.

$$\begin{bmatrix} RPT_0 \\ RPT_1 \\ RPT_2 \\ RPT_3 \\ RPT_4 \\ RPT_5 \\ RPT_6 \\ RPT_7 \end{bmatrix} = \begin{bmatrix} 1 & 1 & 1 & 1 & 0 & 0 & 0 & 0 \\ 0 & 1 & 1 & 1 & 1 & 0 & 0 & 0 \\ 0 & 0 & 1 & 1 & 1 & 1 & 0 & 0 \\ 0 & 0 & 0 & 1 & 1 & 1 & 1 & 0 \\ 0 & 0 & 0 & 0 & 1 & 1 & 1 & 1 \\ 1 & 0 & 0 & 0 & 0 & 1 & 1 & 1 \\ 1 & 1 & 0 & 0 & 0 & 0 & 1 & 1 \\ 1 & 1 & 1 & 0 & 0 & 0 & 0 & 1 \end{bmatrix} \qquad \text{[Equation 9]}$$

As another embodiment, when N=8, M=4, and G=[0,2,5,4,3,7,6,1], a TRP may be as indicated in Equation 10.

$$\begin{bmatrix} RPT_0 \\ RPT_1 \\ RPT_2 \\ RPT_3 \\ RPT_4 \\ RPT_5 \\ RPT_6 \\ RPT_7 \end{bmatrix} = \begin{bmatrix} 1 & 1 & 1 & 1 & 0 & 0 & 0 & 0 \\ 0 & 0 & 1 & 1 & 1 & 1 & 0 & 0 \\ 1 & 0 & 0 & 0 & 0 & 1 & 1 & 1 \\ 0 & 0 & 0 & 0 & 1 & 1 & 1 & 1 \\ 0 & 0 & 0 & 1 & 1 & 1 & 1 & 0 \\ 1 & 1 & 1 & 0 & 0 & 0 & 1 & 0 \\ 1 & 1 & 0 & 0 & 0 & 0 & 1 & 1 \\ 0 & 1 & 1 & 1 & 1 & 0 & 0 & 0 \end{bmatrix} \qquad \text{[Equation 10]}$$

Method 5 (Greedy Search Method)

The above-proposed method may not guarantee that a minimum Hamming weight is maximized. Accordingly, the following algorithm for greedily selecting K1 sets in a mother set may be used.

Through initialization, a mother set having a size of $$K = \binom{N}{M} = \frac{N!}{M!(N-M)!}$$

is generated when the number of subframes in the D2D resource pool is N and the number of transmissions in the D2D resource pool is M. An index of each mother set conforms to the methods proposed in Method 3. Next, a seed index is selected. This seed index is predetermined by a specific UE ID or a specific UE group ID or may be signaled by a network or another UE.

Equation 11 indicates a pseudo code of a greedy search method.

$$S = \{seedindex\},$$ [Equation 11]

$$C = \left\{1, \ldots, \binom{N}{M}\right\} \setminus \{seedindex\}$$

while $\left(i \leq \binom{N}{M}\right)$ if $d(RPT^m(i), RPT^m(j)) \geq d_{min}$ for $\forall j \in S$ $S = \{S, i\}, C = C \setminus \{i\};$ end if $|S| > K1$ break end $i = i + 1;$ end In this case, a finally selected S denotes a selected index set of a TRP and C denotes an unselected index set. The algorithm is to greedily select a TRP having a minimum distance of dmin or more and always generates the same TRP set with respect to given N, M, dmin, and seed index. The algorithm may have different results according to how to select the seed index. In some cases, the size of a finally selected TRP set may not be K1 according to how to select dmin. Therefore, it is known that dmin may have a value up to N−k+1. In this case, k denotes the number of bits for indicating a TRP. Accordingly, the algorithm is performed with respect to dmin starting from N−k+1 and, if the size of a finally selected set is not K1=2^k, the algorithm may be repeatedly performed while decreasing dmin.

Method 6

A method of generating a TRP bit sequence using a Hadamard matrix is proposed.

$$H_1 = \begin{bmatrix} 1 & 1 \\ 1 & 0 \end{bmatrix}$$

$$H_n = \begin{bmatrix} H_{n-1} & H_{n-1} \\ H_{n-1} & \overline{H}_{n-1} \end{bmatrix}$$

where $H_n$ denotes a $2^n \times 2^n$ Hadamard matrix and $\overline{H}$ denotes inversion of 0 into 1 and 1 into 0. Each row indicates a constant weight code having a weight of $2^{n-1}$ except for the first row. A row of the Hadamard matrix may be used as a TRP. All distances between the rows of the Hadamard matrix are the same as $2^{n-1}$. Accordingly, performance is constant regardless of which row is selected. The first row of the Hadamard matrix is a vector, all elements of which are is. Since this vector is different from other vectors in the number of 1s, the first row of the Hadamard matrix may not be used as the TRP. Alternatively, a UE transmitting information that does not need to hear a signal of another UE may use the first row so as to perform transmission using all D2D subframes.

Meanwhile, the above-mentioned Hadamard matrix generation scheme is known as a Sylvester matrix based generation scheme. As another scheme, a Paley matrix based generation scheme may be considered. The Paley matrix based generation scheme may be generated even in the case in which the length of a Paley matrix is not the square of 2 as in 4m (e.g., 1, 2, 4, 8, 12, 16, 20, . . . ).

Table 3 shown below is a summary of the Paley matrix based generation scheme.

TABLE 3

Quadratic character and Jacobsthal matrix

The quadratic character X(a) indicates whether the given finite field element a is a perfect square. Specifically, X(0) = 0, X(a) = 1 if a = b² for some non-zero finite field element b, and X(a) = −1 if a is not the square of any finite field element. For example, in $GF(7)$ the nonzero squares are $1 = 1^2 = 6^2$, $4 = 2^2 = 5^2$, and $2 = 3^2 = 4^2$. Hence X(0) = 0, X(1) = X(2) = X(4) = 1, and X(3) = X(5) = X(6) = −1.

The Jacobsthal matrix Q for $GF(q)$ is the $q \times q$ matrix with rows and columns indexed by finite field elements such that the entry in row a and column b is X(a − b). For example, in $GF(7)$, if the rows and columns of the Jacobsthal matrix are indexed by the field elements 0, 1, 2, 3, 4, 5, 6, then $$Q = \begin{bmatrix} 0 & -1 & -1 & 1 & -1 & 1 & 1 \\ 1 & 0 & -1 & -1 & 1 & -1 & 1 \\ 1 & 1 & 0 & -1 & -1 & 1 & -1 \\ -1 & 1 & 1 & 0 & -1 & -1 & 1 \\ 1 & -1 & 1 & 1 & 0 & -1 & -1 \\ -1 & 1 & -1 & 1 & 1 & 0 & -1 \\ -1 & -1 & 1 & -1 & 1 & 1 & 0 \end{bmatrix}.$$

The Jacobsthal matrix has the properties $QQ^T = qI - J$ and $QJ = JQ = 0$ where I is the $q \times q$ identity matrix and J is the $q \times q$ all − 1 matrix. If q is congruent to 1 (mod 4) then −1 is a square TABLE 3-continued in $GF(q)$ which implies that Q is a symmetric matrix. If q is congruent to 3 (mod 4) then −1 is not a square, and Q is a skew-symmetric matrix. When q is a prime number, Q is a circulant matrix. That is, each row is obtained from the row above by cyclic permutation.
Paley construction I
If q is congruent to 3 (mod 4) then $$H = I + \begin{bmatrix} 0 & j^T \\ -j & Q \end{bmatrix}$$

is a Hadamard matrix of size q + 1. Here j is the all − 1 column vector of length q and I is the (q + 1) × (q + 1) identity matrix. The matrix H is a skew Hadamard matrix, which means it satisfies $H+H^T$ = 2I.
Paley construction II
If q is congruent to 1 (mod 4) then the matrix obtained by replacing all 0 entries in $$\begin{bmatrix} 0 & j^T \\ j & Q \end{bmatrix}$$

with the matrix $\begin{bmatrix} 1 & -1 \\ -1 & -1 \end{bmatrix}$ and all entries ±1 with the matrix $\pm \begin{bmatrix} 1 & 1 \\ 1 & -1 \end{bmatrix}$ is a Hadamard matrix of size 2(q + 1). It is a symmetric Hadamard matrix.

An embodiment of a length-8 Hadamard matrix generated by the Paley matrix scheme is indicated in Equation 12.

$$\begin{aligned}
&1 1 1 1 1 1 1 1. \\
&- 1 - - 1 - 1 1. \\
&- 1 1 - - 1 - 1. \\
&- 1 1 1 - - 1 -. \\
&- - 1 1 1 - - 1. \\
&- 1 - 1 1 1 - -. \\
&- - 1 - 1 1 1 -. \\
&- - - 1 - 1 1 1
\end{aligned}$$
[Equation 12]

where "-" denotes 0.

As another embodiment, a length-20 Hadamard matrix is as indicated in Equation 13.

$$\begin{aligned}
&1 - \ 1 1 1 1 1 1\ 1 1 1 1 1 1\ 1 1 1 1 1 1 \\
&- - 1 - 1 - 1 -\ 1 - 1 - 1 -\ 1 - 1 - 1 - \\
&\\
&1 1\ 1 - 1 1 1 1\ - - - - 1 1\ - - 1 1 - - \\
&1 -\ - - 1 - 1 -\ - 1 - 1 1 -\ - 1 1 - - 1 \\
&1 1\ 1 1 1 - 1 1\ 1 1 - - - -\ - - - - 1 1 \\
&1 -\ 1 - - - 1 -\ 1 - - 1 - 1\ - 1 - 1 1 - \\
&1 1\ 1 1 1 1 1 -\ - - 1 1 - -\ 1 1 - - - - \\
&1 -\ 1 - 1 - - -\ - 1 1 - - 1\ 1 - - 1 - 1 \\
&\\
&1 1\ - - 1 1 - -\ 1 - 1 1 1 1\ - - - - 1 1
\end{aligned}$$
[Equation 13]

-continued $$\begin{aligned}
&1 -\ - 1 1 - - 1\ - - 1 - 1 -\ - 1 - 1 1 - \\
&1 1\ - - - - 1 1\ 1 1 1 - 1 1\ 1 1 - - - - \\
&1 -\ - 1 - 1 1 -\ 1 - - - 1 -\ 1 - - 1 - 1 \\
&1 1\ 1 1 - - - -\ - - 1 1 1 1 1 -\ - - 1 1 - - 1 \\
&\\
&1 1\ - - - - 1 1\ - - 1 1 - -\ 1 - 1 1 1 1 \\
&1 -\ - 1 - 1 1 -\ - 1 1 - - 1\ - - 1 - 1 - \\
&1 1\ 1 1 - - - -\ - - - - 1 1\ 1 1 1 - 1 1 \\
&1 -\ 1 - - 1 - 1\ - 1 - 1 1 -\ 1 - - - 1 - \\
&1 1\ - - 1 1 - -\ 1 1 - - - -\ 1 1 1 1 1 - \\
&1 -\ - 1 1 - - 1\ 1 - - 1 - 1\ - 1 - 1 - - -
\end{aligned}$$

Hereinafter, a modification of the TRP generation method will be discussed based on the TRP generation method using the above-mentioned Hadamard code.

To generate more rows (TRP patterns), $\overline{H}_n$ may be used as a TRP codeword. In this case, a total of $2^{n-1}$ codewords is generated. All elements of the first row of $H_n$ are a sequence of 1s and all elements of the first row of $\overline{H}_n$ are a sequence of 0s. Therefore, these two rows may be excluded from a TRP bit sequence. Then, a total of ($2^{n+1}-2$) rows is generated.

FIG. 9(a) illustrates distribution of a Hamming distance when only $H_n$ is used and FIG. 9(b) illustrates distribution of a Hamming distance when both $H_n$ and $\overline{H}_n$ are used (excluding the first rows thereof). The Hamming distance when both $H_H$ and $H_n$ are used enables increase in the number of codewords without decreasing a minimum distance. In addition, since sequences of row indexes in $H_n$ and $\overline{H}^n$ have completely orthogonal characteristic, a codeword having a maximum distance is also generated. According to the above proposed method, when the length of a TRP indication bit sequence is (n+1) bits, $2^{n+1}$ TRPs (($2^{n+1}-2$) TRPs except for unused rows) having a transmission opportunity of $2^{n-1}$ may be generated. As an embodiment, when n=3, a used TRP is as indicated in Equation 14.

$$R = \begin{bmatrix} H'_3 \\ \overline{H}'_3 \end{bmatrix} = \begin{bmatrix} 1 & 0 & 1 & 0 & 1 & 0 & 1 & 0 \\ 1 & 1 & 0 & 0 & 1 & 1 & 0 & 0 \\ 1 & 0 & 0 & 1 & 1 & 0 & 0 & 1 \\ 1 & 1 & 1 & 1 & 0 & 0 & 0 & 0 \\ 1 & 0 & 1 & 0 & 0 & 1 & 0 & 1 \\ 1 & 1 & 0 & 0 & 0 & 0 & 1 & 1 \\ 1 & 0 & 0 & 1 & 0 & 1 & 1 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix}$$ [Equation 14]

where $H'_3$ and $\overline{H}'_3$ denote matrices except for the first rows of $H_n$ and $\overline{H}_n$ respectively.

Although the first rows may be excluded from $H_n$ and $\overline{H}_n$, the first columns may be excluded for a similar reason. This is because the first columns cannot hear signals of other UEs because the first rows are all 1s.

When a TRP pattern is generated using both $H_n$ and $\overline{H}_n$, an orthogonal property is always maintained between TRPs of $H_n$ and $\overline{H}_n$. However, as a sub-optimal method, $H_n$ and/or $\overline{H}_n$ may be permutated column-wise, thereby using different permutations as the TRP pattern. In this case, different permutation indexes may be predetermined and UEs or UE groups may use different permutation indexes. A permutation index may be selected in linkage with a combination of all or some of a Tx/Rx UE ID, a cell ID, a group ID, and a synchronization source ID. This method may be extended to all proposed methods. As an example, even in Methods 1 to 3, TRPs may be generated by a specific bit field in an SA and permutation for the TRPs may be performed using a specific ID.

A new TRP set may be generated by transposing $H_n$ and $\overline{H}_n$. Similarly, the new TRP set may also be generated by transposing $H'_n$ and $\overline{H}_n$.

Upon generating the TRP set using $H'_n$ and $\overline{H}'_n$, since the total number of TRPs is not the square of 2, some TRPs may be excluded. In this case, indexes selected (or excluded) from $H'_n$ and $\overline{H}'_n$ may be pre-defined in a specification as fixed values or a plurality of indexes for configuring one set may be defined. For example, when n=2^3, if both $H'_3$ and $\overline{H}'_3$ are used, a total of 14 TRPs is generated. If the TRPs are indicated by 3 bits, a total of 8 TRPs is selected. In this case, a selectable combination may be predetermined and a TRP group may be configured according to the predetermined combination. For example, a TRP group #0={1, 2, 4, 5, 6, 7, 9, 11} and TRP group #1={2, 4, 5, 6, 7, 8, 9, 11}, . . . may be defined. The size of a TRP group may be predetermined or the size of a TRP group and indexes used in each TRP group may be signaled by a network through a higher-layer signal. The used indexes of the TRP group may be determined by a combination of all, some, or a multiple of a Tx UE ID, an Rx UE ID/target ID, a UE group ID, a synchronization source ID, and a (virtual/physical) cell ID. For example, a value obtained by performing modulo operation on a specific bit sequence of the group ID by the total size of a TRP group may be determined as a TRP used by UEs of the group.

In this case, TRP indexes selected (or excluded) from $H'_n$ and $\overline{H}'_n$ may be differently selected according to a CS combination described below.

A method of generating an additional TRP pattern by applying a CS to $H_n$ or $\overline{H}_n$ is proposed. The additional TRP pattern is generated by applying the CS to $H_n$ and/or $\overline{H}_n$. As an example, when CS 1 is applied in the above embodiment, a TRP is as indicated in Equation 15.

$$R_{CS=1} = \begin{bmatrix} 0 & 1 & 0 & 1 & 0 & 1 & 0 & 1 \\ 0 & 1 & 1 & 0 & 0 & 1 & 1 & 0 \\ 1 & 1 & 0 & 0 & 1 & 1 & 0 & 0 \\ 0 & 1 & 1 & 1 & 1 & 0 & 0 & 0 \\ 1 & 1 & 0 & 1 & 0 & 0 & 1 & 0 \\ 1 & 1 & 1 & 0 & 0 & 0 & 0 & 1 \\ 0 & 1 & 0 & 0 & 1 & 0 & 1 & 1 \\ 1 & 0 & 1 & 0 & 1 & 0 & 1 & 0 \\ 1 & 0 & 0 & 1 & 1 & 0 & 0 & 1 \\ 0 & 0 & 1 & 1 & 0 & 0 & 1 & 1 \\ 1 & 0 & 0 & 0 & 0 & 1 & 1 & 1 \\ 0 & 0 & 1 & 0 & 1 & 1 & 0 & 1 \\ 0 & 0 & 0 & 1 & 1 & 1 & 1 & 0 \\ 1 & 0 & 1 & 1 & 0 & 1 & 0 & 0 \end{bmatrix}$$ [Equation 15]

In this case, the CS should be simultaneously applied to all TRPs in a TRP set so as not to lose a distance characteristic. If the TRP set is configured only by $H'_n$ or $\overline{H}'_n$, the same CS should be applied to all TRPs. However, when the TRP set is configured by both $H_n$ and $\overline{H}_n$, different CSs may be applied to the respective matrices. When different CSs are applied, partial TRPs may be excluded in order to maintain the distance characteristic. A CS value used for each TRP set may be signaled by a network or may be a predetermined fixed value. Alternatively, the CS value may be a value linked with a cell ID or a synchronization source ID. The CS value may be linked with a Tx UE ID, a target ID, or a group ID. If the CS value is a, when a set of TRP patterns is represented by $R_{CS=a}$, a set of TRP patterns to which CS is not applied may be represented by $R_{CS=0}$. A specific UE or UE group may use TRPs to which different CSs are applied. This serves to generate more TRP patterns. In this case, some codewords may overlap due to CS of TRP sets to which different CSs are applied. Then, TRP sets should be configured except for the overlapping codewords. TRP indexes selected (or excluded) from $H'_n$ and $\overline{H}'_n$ may differ according to a combination of CSs. For example, when n=2^3 and TRPs are generated using both $H'_3$ and $\overline{H}'_3$, a total of 14 TRPs may be generated. If CSs of 0 and 1 are used, 1, 2, 4, 5, 6, 7, 9, 11}-th TRPs are selected from among the 14 TRPs generated using both $H'_3$ and $\overline{H}'_3$, thereby generating a total of 16 TRPs. (8 TRPs for CS0 and 8 TRPs for CS1). When CS is applied to selected indexes, 8 TRPs are selected to avoid overlapping of the same TRP. In this case, a generated TRP is indicated in Equation 16.

$$\begin{bmatrix} 1 & 0 & 1 & 0 & 1 & 0 & 1 & 0 \\ 1 & 1 & 0 & 0 & 1 & 1 & 0 & 0 \\ 1 & 1 & 1 & 1 & 0 & 0 & 0 & 0 \\ 1 & 0 & 1 & 0 & 0 & 1 & 0 & 1 \\ 1 & 1 & 0 & 0 & 0 & 0 & 1 & 1 \\ 1 & 0 & 0 & 1 & 0 & 1 & 1 & 0 \\ 0 & 0 & 1 & 1 & 0 & 0 & 1 & 1 \\ 0 & 0 & 0 & 0 & 1 & 1 & 1 & 1 \end{bmatrix} CS0$$

$$\begin{bmatrix} 0 & 1 & 0 & 1 & 0 & 1 & 0 & 1 \\ 0 & 1 & 1 & 0 & 0 & 1 & 1 & 0 \\ 0 & 1 & 1 & 1 & 1 & 0 & 0 & 0 \\ 1 & 1 & 0 & 1 & 0 & 0 & 1 & 0 \\ 1 & 1 & 1 & 0 & 0 & 0 & 0 & 1 \\ 0 & 1 & 0 & 0 & 1 & 0 & 1 & 1 \\ 1 & 0 & 0 & 1 & 1 & 0 & 0 & 1 \\ 1 & 0 & 0 & 0 & 0 & 1 & 1 & 1 \end{bmatrix} CS1$$

[Equation 16]

Meanwhile, UEs of different cells or different groups need to generate different transmission patterns using generated TRPs. To maintain a distance characteristic, all TRPs should be simultaneously permutated. If a specific TRP set represented by a K-by-N matrix is generated, the TRP set may be permutated column-wise to generate a new TRP set. For example, when N subframes are present, a maximum of N! different permutations may be generated. Indexes for the permutated TRP sets may be linked with a combination of a Tx UE ID, an Rx UE ID, a (physical/virtual) cell ID, a group ID, a synchronization source ID, and other IDs. For example, an index generated by performing modulo operation on the synchronization source ID by N! is used as a permutation ID. For example, after a TRP is generated based on a Hadamard matrix, the TRP is permutated column-wise. It is assumed that an index according to permutation is predetermined. In this case, all indexes generated through permutation may not be used. Then, indexes to be used after permutation may be predetermined or may be signaled through a higher-layer signal such as an RRC signal. When an index for each permutation is predetermined, the above-mentioned IDs or a combination of the IDs may be used to determine a TRP permutation index. If a permutation ID is determined by the above-described scheme, a specific TRP in a TRP set of the permutation ID may be indicated by a combination of all or some of a Tx UE ID, an Rx UE ID, a (physical/virtual) cell ID, a group ID, a synchronization source ID, and an explicitly added TRP indication bit field.

The Hadamard matrix based TRP generation method is disadvantageous in that a TRP is generated only with respect to a specific subframe length or a specific weight (N/2) (where N is the square of 2). To solve this shortcoming, a method of generating the TRP for weight which is lower than the specific weight and length which is not the square of 2 is proposed.

Hadamard matrix based lower weight TRP generation method: A method of generating a lower weight TRP with respect to the length of the square of 2 is proposed. When $N=2^n$, a TRP is generated only with respect to a weight of $2^{(n-1)}$. The method of generating the lower weight TRP is performed by replacing some of $2^{(n-1)}$ is in each TRP with 0s. For example, if a specific n-th 1 is replaced with 0 in each TRP, a TRP having weight lower by 1 is generated. However, if the same n-th 1 is replaced with 0 in all TRPs, there is probability that the weight of a specific subframe (the number of UEs performing transmission) is remarkably lowered relative to weights of other subframes. In this case, it is desirable that locations of is excluded in TRPs be distributed so that is may be evenly excluded over all subframes. As an example, each TRP index may be used as an offset of an order excluding 1. For instance, when a=TRP index among $2^n-1$ is, an a-th TRP sequentially replaces L is starting from an a-th 1 with 0s. If the a-th 1 exceeds a maximum weight, a value obtained by performing modulo operation on a by $2^{(n-1)}$ is used as the offset. Meanwhile, is may not be consecutively replaced with 0s. As another example of a predetermined pattern among is (e.g., only even-numbered is are replaced with 0s), a mask for transforming 1 into 0 (a mask for replacing 1 with 0) may be configured as a function of a Tx (or Rx) UE ID or a function of a synchronization source ID or a virtual/physical cell ID. This serves to randomize locations of is deleted in a process of generating a lower weight even when UEs select the same TRP.

Although the method has been described with respect to a TRP having a length of the square of 2, the same principle may be applied to the case in which a TRP has a length which is not the square of 2. When a TRP has a length which is not the square of 2, a TRP may be generated by deleting or (repeatedly) adding some subframes from a TRP having a length of the square of 2, which will be described below. In a TRP generation process, the number of is may differ according to a TRP. In the TRP generation process, the number of is may differ according to a TRP and a different number of is for each UE may be replaced with 0s so that the number of is may be the same in a lower weight generation process.

A TRP generation method when the number of D2D subframes is not the square of 2 is as follows.

As a simple repeating method, a method of generating a Hadamard matrix based TRP having a length of the square of 2, which is nearest to N and is less than N, and then repeating generation of such a TRP to generate a length-N TRP is proposed. For example, when the length of a TRP is not the square of 2, a TRP generated by the square of 2 is repeated and filled. If TRPs having different weights are generated, a weight equalization process is performed according to a predetermined rule. For example, when a TRP of N=20 is generated based on a Hadamard matrix, if a length-16 TRP is generated first and the front four subframes are selected from the length-16 TRP to generate the length-20 TRP, weights may vary with respective TRPs. In this case, with respect to a TRP having a heavier weight, is are replaced with 0s according to a predetermined rule (e.g., specific n-, (n+1)-, . . . , (n+k-1)-th is are replaced with 0s, wherein k is an exceeded weight number as compared with other TRPs).

Alternatively, a Hadamard matrix based TRP having a length of the square of 2, which is the nearest to N and is greater than N is generated and then some subframes are excluded to generate a length-N TRP. The subframes may be excluded by a given rule or excluded subframe indexes may be predetermined or may be signaled to a UE through a higher-layer signal such as an RRC signal or through a physical layer signal (an SIB or an (E)PDCCH).

Method 7

In a state in which subframes (in which D2D transmission can be performed) in a TRP definition interval are indexed, a start index and the number of subframes may be signaled in an SA as TRP signaling. The subframe indexes may be indexes interleaved in the time domain rather than in a time order. A subframe interleaving order in a specific UE or UE group may be linked with all or some of a Tx UE ID, an Rx UE ID, a group ID, and a synchronization source ID.

Method 8

A method of signaling a TRP by indicating a subframe interval between D2D transmissions is proposed. For example, when initial transmission is performed in an a-th subframe, if a second D2D signal transmission timing is a+$n_1$, values of a and $n_1$ are signaled. Similarly, a third D2D signal transmission timing may be a time obtained by adding $n_2$ to the second signal transmission timing. The subframe interval $n_1$ between the first and second D2D signal transmission timings and the subframe interval $n_2$ between the second and third D2D signal transmission timings may be equal to each other as $n_1$ or may be different from each other. Next, an i-th D2D signal may be transmitted after a subframe interval indicated in an (i−1)-th D2D signal transmission location.

Hereinafter, a method of signaling an initial transmission location a and a subframe interval $n_1$ is proposed.

In determining the first transmitted subframe location a, the first D2D transmission location may be determined by one of the following schemes or by a combination of the following schemes.

a) Explicit indication through SA: An SA includes a bit field indicating the first D2D signal transmission location. As an example, an A-bit field may be included in order to indicate a T-TRP and B bits of the A-bit field are used to indicate the first transmission location.

b) Location linked with an ID included in SA: An ID may be transmitted in the SA. The first transmission location may be determined in linkage with the ID.

c) Location linked with a source or destination ID: The first transmission location in a D2D resource pool may be determined in linkage with a source ID or a destination ID.

d) Location linked with a synchronization source ID: The first transmission location in a D2D resource pool may be determined in linkage with an SS ID.

In the above proposed methods, in order to secure a minimum number of retransmissions, subframes in which first transmission can be generated in a pool may be limited to specific subframe indexes or less. For example, when 40 D2D resource pools are configured, subframes in which first transmission can be generated may be limited to first 8 subframes or less. In other words, the number of bits indicating the first transmission location is limited to a specific value or less and the number of bits may be linked with the number of subframes of a resource pool. In this example, when the first transmission location is linked with the destination ID, a value obtained by performing modulo operation on the ID by 8 may indicate the first transmission subframe location. If the above-mentioned method a) is used and the first transmission subframe region is within first 8 subframes, the first transmission location may be indicated by three bits. A subframe in which first transmission can be generated may be determined in linkage with the length of a resource pool. For example, if the D2D signal transmission resource pool is N subframes, a rule indicating that first transmission should be generated within first N/a (where a is a predetermined value) subframes may be defined.

As a method of signaling a subframe interval between D2D signal transmissions, $n_i$ may be signaled by one of the following methods.

a) $n_i$ may be selected within a preset candidate set. A candidate of a subframe interval may be predetermined or may be signaled through a physical layer signal or a higher-layer signal by an eNB, a specific UE (which may be a Tx UE and the set may be signaled through an SA in the case of the Tx UE), or a relay node. For example, $n_i$ may be set such that n={1, 2, 3, 4} or {1, 2, 4, 8}. In this case, the candidate set may be determined in linkage with a maximum number of transmissions per packet or the number of retransmissions. For example, if the number of retransmissions per packet is 4, $n_i$ may be set such that n={2, 4, 6, 8} and, if the number of retransmissions per packet is 8, $n_i$ may be set such that n={1, 2, 3, 4}. To this end, a reference candidate set may be signaled or preset as $\{b_1, b_2, \ldots, b_k\}$ (where the size k of the candidate set is a predetermined value) and an actually used candidate set may be generated by multiplying (e.g. $\{x*b_1, x*b_2, \ldots, x*b_k\}$) a predetermined number by the reference candidate set according to the number of retransmissions or a maximum number of transmissions per packet. To this end, all or some of the number of retransmissions per packet, the (maximum) number of D2D signal transmissions, and the number of independent packets in a pool may be explicitly signaled in the SA.

b) a and n (an average subframe interval between D2D transmissions) are signaled through the SA and a pattern shifted positively (+) or negatively (−) based on n is signaled through the SA. A value used for shift is determined within a predetermined set and this set may be predetermined as $\{c_1, c_2, \ldots, c_g\}$ or may be signaled through a physical layer signal or a higher-layer signal by an eNB or a specific UE (which may be a Tx UE). This set may be determined like the above-mentioned candidate set in linkage with a maximum number of transmissions in a pool or the number of retransmissions per packet (e.g., the number of retransmissions per packet, a (maximum) number of D2D signal transmissions, or the number of independent packets in a pool). For example, the reference candidate set=$\{c_1, c_2, \ldots, c_g\}$ (where the size g of the set is a predetermined value) may be signaled or preset and an actually used candidate set may be generated by multiplying (e.g., $\{x*c_1, x*c_2, \ldots, x*c_g\}$) a predetermined number by the reference candidate set according to the number of retransmissions per packet or a maximum number of transmissions.

If the candidate set $\{b_1, b_2, \ldots, b_k\}$ of the subframe interval (between D2D signal transmissions) or the candidate set $\{c_1, c_2, \ldots, c_g\}$ of subframe shift (based on an average subframe interval) is given, a method of hopping the candidate set may use one of the following methods.

a) Explicit indication through SA: An n-bit field may be explicitly transmitted in the SA and a subframe interval per transmission or a subframe shift pattern may be determined in linkage with the value of this bit field. This n-bit field is used as a seed value of a random sequence generator and a value obtained by performing modulo operation on a random sequence generated by the random sequence generator by a set size is used as an index of an element in the candidate set.

b) Location linked with an ID included in SA: A subframe interval per transmission or a subframe shift pattern may be determined in linkage with an ID transmitted in the SA. For example, the ID included in the SA is used as a seed value of a random sequence generator and a value obtained by performing modulo operation on a random sequence generated by the random sequence generator by a set size is used as an index of an element in the candidate set.

c) Location linked with source or destination ID: A subframe interval per transmission or a subframe shift pattern may be determined in linkage with the source ID or the destination ID. For example, the source ID or the destination ID is used as a seed value of a random sequence generator and a value obtained by performing modulo operation on a random sequence generated by the random sequence generator by a set size is used as an index of an element in the candidate set.

d) Location linked with SS ID: A subframe interval per transmission or a subframe shift pattern may be determined in linkage with the SS ID.

In the above embodiment, if a cellular signal is transmitted together with a D2D signal as in communication mode 1, a constant subframe interval during D2D transmission is favorable for multiplexing with an existing WAN signal. In this case, the subframe interval may be fixed to $n_1 = n_2 = \ldots = n$ and, thus, a candidate set ($\{b_i\}$, or $\{c_i\}$) may have the same elements. If the candidate set has the same elements, a bit indicating that a set in the SA has the same elements may be transmitted. In this case, a bit field for indicating a hopping pattern of the set may not be transmitted, may be fixed to a specific state (e.g., all zeros), or may be used for other purposes.

Meanwhile, Method 8 may be differently operated according to mode 1 and mode 2. For example, in the case of mode 1, a TRP of an equal interval is advantageous in that multiplexing with the WAN signal is simplified as described above. To achieve this purpose, randomization or permutation using an ID included in the SA is not performed. However, in the case of mode 2, since transmission is performed only within a predefined resource pool, smooth multiplexing with the WAN signal may not be a main design criterion and, in this case, it is desirable to perform randomization/permutation in order to solve limitations or half duplex between D2D UEs or in-band radiation. Performing randomization/permutation may include the following meanings.

a) Elements of a set ($\{b_i\}$, or $\{c_i\}$) are randomly selected from a set not having the same elements.

b) Permutation for a bit sequence is performed using an SA ID

As another method, TRPs of an equal interval may be generated in both mode 1 and mode 2 and permutation for a TRP bitmap may be performed using an ID included in the SA only in mode 2.

To cause an Rx UE to be aware of an operation of differently interpreting TRPs of mode 1 and mode 2, one of the following methods may be used.

a) SA pools of mode 1 and mode 2 are distinguished.

b) A bit field for distinguishing between mode 1 and mode 2 is included in the SA.

c) Mode 1 and mode 2 are distinguished according to a frequency location at which the SA is transmitted: For example, if the SA has a unit size of one PRB pair and is signaled in units of 2 RBs due to an insufficient bit size of DCI in mode 1, the SA of mode 1 is transmitted in RBs which are multiples of 2 in the frequency domain and the SA of mode 2 is transmitted in RBs which are not multiples of 2. Alternatively, the frequency domain in which the SA of mode 1 is transmitted and the frequency domain in which the SA of mode 2 is transmitted may be predetermined or an SA pool may be signaled by an eNB.

d) A DMRS base sequence of a scrambling sequence of the SA is distinguished according to mode 1 and mode 2: As an example, in mode 1, 510 is used for a cell ID part in an equation used to generate the DMRS base sequence or the scrambling sequence and, in mode 2, 511 is used for a part into which a cell ID is inserted. Alternatively, an OCC and/or CS of a DMRS of the SA is distinguished according to mode 1 and mode 2. For example, in mode 1, [1 −1] is used as the OCC and, in mode 2, [1 1] is used as the OCC.

e) CRC is masked to a CRC mask of the SA by a combination of a flag and an ID of mode 1/2: For example, there is a flag 1 for mode 1 and a flag 0 for mode 2 and a CRC may be masked by XOR of the flag and an SA ID. As another example, if the SA ID is 8 bits and the CRC of the SA is 16 bits, in mode 1, the 8-bit ID may be repeated twice and, in mode 2, the first 8-bit ID may be masked without change and the second 8-bit ID may be masked in an inverted form (by performing XOR between ID and 1). For example, mode 1 (mode 2): 16-bit CRC mask=[8-bit ID, 8-bit ID], mode 2 (mode 1): 16-bit CRC mask=[8-bit ID, $\overline{\text{8bitID}}$].

Method 9

Meanwhile, the above proposed methods serve to generate all TRPs for N subframes when N, M, and K1 are determined. Although these methods are useful in the case in which all UEs have the same transmission opportunity M, TRP generation may be complicated in the other cases. Accordingly, a TRP basic unit may be defined and all TRPs may be generated by repeating the TRP basic unit multiple times. Tx UEs having different transmission opportunities may designate a used index out of the basic unit so that the Tx UEs may have different transmission opportunities.

The following parameters are defined.

N: The number of D2D subframes

M: The number of transmissions in N D2D subframes

TRP basic unit: The TRP basic unit is a basic unit constituting a TRP. N1 subframes constitute one basic unit and a TRP of N subframes is configured by repeating the basic unit.

M1: The number of transmissions in a basic unit.

N1: The number of D2D subframes in a basic unit.

All or some of the parameters may be predetermined or may be signaled through a physical layer signal or a higher-layer signal by a network. Some parameters may be commonly signaled to UEs and other parameters may be transmitted through UE-dedicated signaling. For example, in mode 1, the number of transmissions in a TRP may be signaled through UE-dedicated signaling. Upon receiving all or some of the parameters by the network, a D2D Tx UE may transmit all or some of the received information through the SA again to a D2D Rx UE.

A method of generating the TRP basic unit may use one of the above proposed methods. For example, when Method 3 is used as a basic unit generation method, if all or some of the number N1 of subframes of the basic unit, the number M1 of transmissions in the basic unit, and the number K1 of TRPs in the basic unit may be preset or signaled through a higher-layer signal, a mother set having a size of $$\binom{N1}{M1}$$

may be generated based on the preset or signaled information and the TRP basic unit may be generated by selecting K1 subsets from the mother set. When specific subsets are selected from the mother set, selected TRP indexes may be pre-given as a table. An additional table may be given according to a combination of N1, M1, and K1. Alternatively, the basic unit may be generated using the equation proposed in Method 3.

Thus, if the TRP basic unit is generated, all TRPs may be configured based on the TRP basic unit. In this case, the TRP basic unit is repeated multiple times and all TRP may be configured using a method directly indicating, through the SA, which TRP in the basic unit a TRP bit sequence uses. Alternatively, the SA may indicate only the first index of the TRP basic unit and the TRP bit sequence may select different indexes of basic units by a preset hopping pattern.

Meanwhile, if the number of transmissions in one TRP differs according to a UE in the above-mentioned method, the SA may indicate a TRP basic unit used by a Tx UE. For example, if 4 basic units constitute one TRP, a UE having the number of transmissions corresponding to half the number of transmissions by other UEs may configure a TRP using only two basic units among the 4 basic units. In this case, a TRP basic unit used to distribute TRP basic units used by UEs having the same number of transmissions may be linked with a sequence generated by one or multiple combinations of a Tx UE ID, a group ID, and a target ID. For example, when 4 TRP basic units are present and 2 basic units are selectively used, the 2 basic units are selected in linkage with the above-mentioned UE ID. Alternatively, the number of transmissions performed by a Tx UE may be directly signaled through the SA. Then, the number of selected basic units is determined and the selected basic units may be determined in linkage with a specific ID as in the above proposal.

Figure 10:
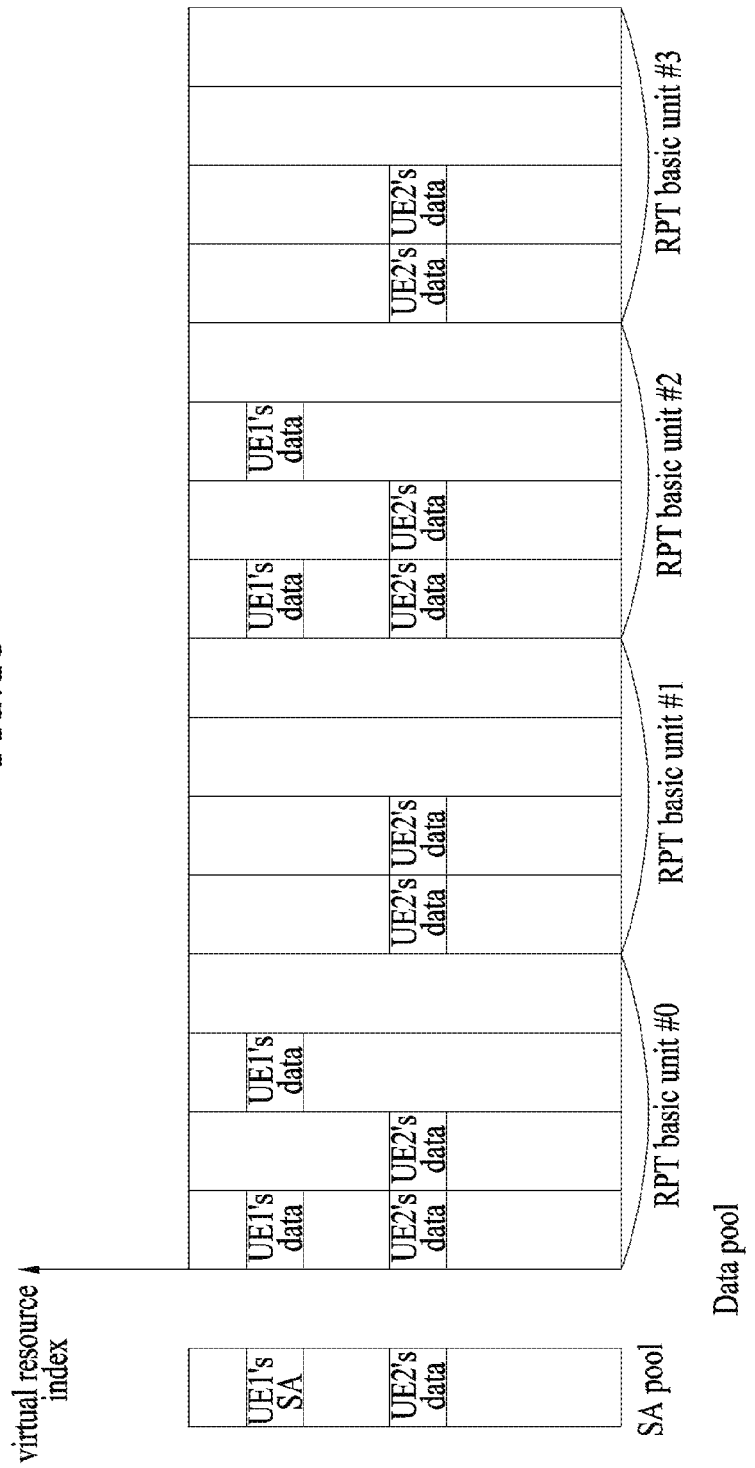

Meanwhile, if UEs having different transmission opportunities transmit the SA in an SA pool, partial frequency resources may be wasted without being used in a specific TRP basic unit. For example, in FIG. 10, it is assumed that UE1 uses TRP basic units #0 and #3 and UE2 uses all of TRP basic units #0, #1, #2, and #3. When UE1 and UE2 transmit the SA in the same pool, virtual frequency resources of UE1 of TRP basic unit #1 and unit #3 may not be used and may be wasted. To prevent this phenomenon, it is desirable for Tx UEs using different basic units to transmit the SA in different SA pools upon transmitting the SA. In other words, D2D Tx UEs using the same basic unit transmit the SA in the same SA pool. SA pools may be distinguished by a UE ID and a transmission opportunity number. In this case, a Tx UE ID, a group ID, or a target ID may be used. For example, it is assumed that a Tx UE having a Transmission Opportunity Number (TON) of M is present and a Tx UE having a TON of M12 is present. It is also assumed that a total of L basic units is present. The UE having a TON of M uses all basic units and a UE having a TON of M12 should select L/2 basic units among the L basic units. Selection of basic units may be determined by a Tx UE ID, an Rx UE ID, and/or a group UE ID. In this case, the UEs having a TON of M may continuously transmit the SA in the same SA pool as that used by UEs having a TON of M/2 and the UEs having a TON of M12 may transmit the SA in an SA pool for basic units used thereby. An important thing is that UEs using different basic units may transmit the SA in the same frequency resource and, in order to prevent collision between SAs, the UEs using different basic units transmit the SA in different SA pools.

Figure 11:
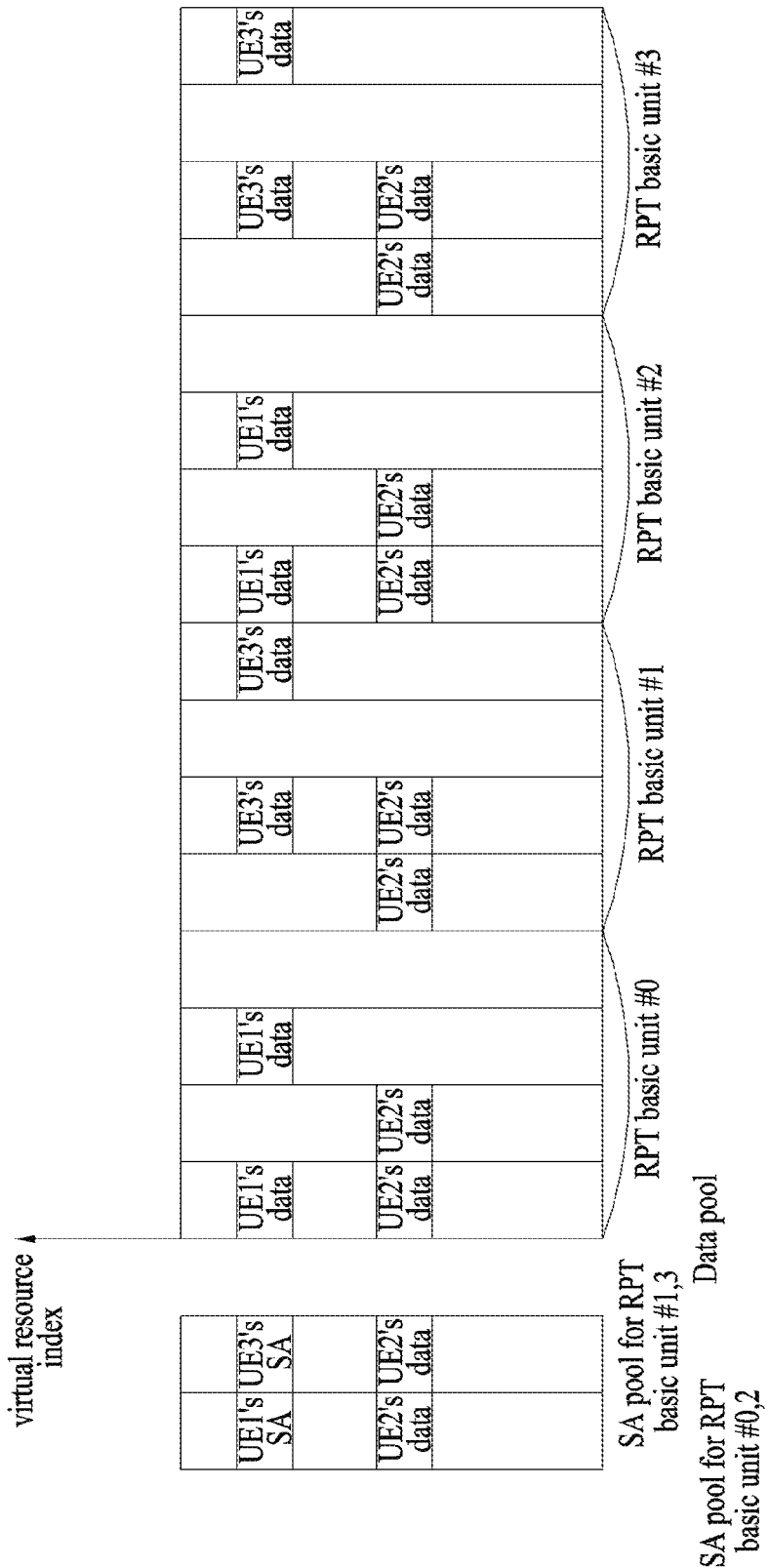

Meanwhile, as illustrated in FIG. 11, a Tx UE may indicate an index of a basic unit used thereby through the SA. As an indication method, an explicitly indicated bit may be included, or a basic unit linked with all or some bits of a TRP or an ID bit field may be implicitly determined.

Meanwhile, when one UE transmits D2D data to a plurality of Rx UEs (or a plurality of Rx UE groups), the UE may transmit the D2D data by indicating a plurality of TRPs according to one D2D signal transmission period. In this case, packets directed to a plurality of different UEs may be simultaneously transmitted in a specific subframe. If a plurality of packets is discontinuous in the frequency domain, a single carrier characteristic is damaged and thus performance may be deteriorated. In this case, an operation of performing transmission only for specific predetermined D2D data and skipping or dropping transmission for the other data is proposed. In this case, transmission priority per D2D data may be predetermined or the D2D data may be transmitted by a predetermined rule (e.g. a low number among UE IDs may always be transmitted first or, when retransmission and initial transmission overlap, initial transmission or retransmission may always be performed first).

Meanwhile, the proposed TRP may be defined in a normal subframe or a normal UL subframe rather than only in a D2D resource pool. If the UL subframe or subframe does not belong to the D2D resource pool, a rule may be determined such that D2D transmission is dropped in the corresponding subframe. As an example, such an operation may be limitedly applied only to the case in which the D2D resource pool is not defined in D2D communication mode 1. For instance, the D2D resource pool in D2D communication mode 1 may include all UL subframes between SA periods unless otherwise defined. In this case, a TRP that a D2D Tx UE transmits through the SA may be defined with respect to a normal subframe after SA transmission (SA pool) or with respect to a UL subframe after SA transmission. If the TRP is indicated in this virtual mode 1 pool, the TRP may be indicated with respect to a normal subframe or with respect only to a UL subframe. If the TRP is indicated with respect to a normal subframe, a rule may be determined such that D2D transmission in the corresponding subframe other than the UL subframe is not performed. Meanwhile this principle may also be applied to mode 2. For example, if the D2D resource pool is defined and the TRP is defined in a normal UL subframe, D2D transmission is not performed when the UL subframe does not belong to the D2D resource pool.

Method 10

A TRP applied to actual D2D signal transmission may be represented in the form such as (TRP bitmap) AND (D2D resource pool bitmap) (where AND denotes a logical operation). The TRP bitmap denotes a TRP bitmap indicated by the SA of a Tx UE and the D2D resource pool bitmap denotes a bitmap of a D2D resource pool which is predetermined or indicated by an eNB. The two bitmaps may be defined only in a UL subframe or may be indicated in all subframes. When a bitmap is defined in the UL subframe, an application range of the bitmap varies according to TDD configuration, whereas the length of the bitmap for indicating the D2D resource pool may be shortened because the bitmap is defined only in the UL subframe. If the bitmap is defined in all subframes, since DL subframes should be excluded, the length of the bitmap to be defined for D2D signal transmission may increase.

Meanwhile, the above-described TRP generation method may also be applied when a discovery signal is transmitted by instruction of an eNB. Type 1 discovery is a scheme in which an eNB or a specific scheduling node (a UE may be the scheduling node when the UE has a scheduling function) configures a resource pool and a UE transmitting a discovery signal selects one or multiple resources from the configured resource pool to transmit the discovery signal. In type 2 discovery, an eNB or a specific scheduling node (a UE may be the scheduling node when the UE has a scheduling function) indicates a discovery transmission resource for a specific UE. In this case, the discovery transmission resource may be individually indicated with respect to every discovery transmission or may indicate multiple discovery transmission resources through one instruction. If the eNB or the scheduling node individually indicates the discovery signal transmission resource, this may be referred to as type 2a and, if the eNB or the scheduling node indicates multiple discovery signal transmission resources, this may be referred to as type 2B.

In type 2B, the eNB desirably sets UEs to transmit discovery signals at different locations. However, when Tx UEs simultaneously transmit multiple discovery signals, since the UEs cannot simultaneously receive (hear) signals while transmitting the signals, the multiple UEs cannot discover each other. This problem may be referred to as a half duplex constraint. To solve the half duplex constraint, it is desirable that an eNB or a scheduling node perform transmission at as different times as possible.

If a resource pool for type 2B is preconfigured and a timing transmitted in each pool is indicated by the eNB, this has a problem similar to that when a TRP is signaled in D2D communication.

Assuming that a resource pool for type 2B is configured by N subframes and each UE transmits a discovery signal in M subframes during N subframes, an eNB (hereinafter, a scheduling node may also be referred to as the eNB) may indicate a length-N TRP to each discovery signal Tx UE. An indication method may be one of the above-proposed methods. In this case, a discovery resource pool (period) may be periodically configured in discovery and this resource pool may be signaled through an SIB. A resource pool of type 2B may be included in a resource pool of type 1 and an additional resource pool may be configured.

When a type 2 discovery resource is configured by T subframes and, when one UE transmits discovery signals M times on a corresponding resource, the eNB may indicate a TRP having a weight of M and a length of T. In this way, a scheme in which the eNB indicates multiple discovery signal transmissions is referred to as type 2B discovery. The T subframes may be generated by multiple discovery periods or may be configured within one discovery period. As one of the above-proposed TRP generation methods, the eNB may signal a TRP index to a type 2B discovery signal Tx UE through a physical layer signal (or a higher-layer signal). In this case, the TRP index may be hopped by a specific rule at every period or column permutation may be performed. A permutation rule may be linked with specific IDs or a combination of the specific IDs among a physical cell ID, a virtual cell ID, a synchronization source ID, a D2D-RNTI, and a Tx UE ID. A scheme of generating a TRP set may be linked with specific IDs or a combination of the specific IDs among a physical cell ID, a virtual cell ID, a synchronization source ID, a D2D-RNTI, and a Tx UE ID. The eNB may signal a specific TRP set and a TRP to be used in the TRP set. As described above, since the TRP set may be linked with a specific ID (e.g., cell ID), the ID may be signaled or additional explicit signaling for designating the TRP set may not be present. Alternatively, a specific ID may be signaled to directly indicate the specific TRP set.

Meanwhile, a set of values that can be configured by k which is the number of is in a subframe indication bitmap may be configured per duplex mode. A set of subframe indication bitmaps (size N) may be predefined and a length-N subframe indication bitmap may be repeated to configure all TRPs in a subframe pool. In this case, a set of ks, k being the number of is that can be transmitted in the set of subframe indication bitmaps, may be predetermined. In addition, subframe indication bitmaps of the set of ks may be indexed and a specific index may be indicated using a TRP indication bit of an SA. For example, N=8 and k={1, 2, 4, 8}. More specifically, the set of subframe indication bitmaps may be defined with respect to k. If the size of the set of subframe indication bitmaps is greater than the number of bits of a subframe indication bitmap that can be indicated through the SA, some subframe indication bitmaps may be selected and, if not, all possible combinations according to (N, k) may be included in the set of subframe indication bitmaps. For example, if the number of bits indicating a subframe indication bitmap through the SA is 8, a total of 256 subframe indication bitmaps may be indicated. If one bit is used to distinguish between sets of subframe indication bitmaps, a total of 128 subframe indication bitmaps may be indicated through the SA. As in the above example, when N=8 and k={1, 2, 4, 8}, a total of 107 (=8C1+8C2+8C4+8C8) subframe indication bitmaps may be defined. The subframe indication bitmaps may be applied in a UL subframe and may be applied only in a D2D resource pool in the UL subframe. TDD has sparsely configured subframes in a D2D resource pool relative to FDD. In the case of VoIP packet having a delay constraint, it is necessary to design a subframe indication bitmap so as to perform more transmissions and, in this case, a set of ks may be differently configured for FDD and TDD. Accordingly, in TDD, permission of more transmissions is desirable in that the delay constraint can be satisfied. In terms of this point, in TDD, the set of ks may be configured mainly by numbers larger than those in FDD. For example, if N=8 and k={1, 2, 4, 8} in FDD, then N=8 and k={1, 4, 6, 8} in TDD. Number 2 in FDD is changed to 6 in TDD and this scheme enables more transmissions in TDD while a Hamming distance characteristic is not changed.

When N=8, one of combinations of Table 4 may be selected in TDD and this may be differently set per TDD configuration. For example, in TDD configuration 5, a combination having more is (e.g., {4, 6, 7, 8} in Table 4 below) is selected. If there are more UL subframes as in TDD configuration 0, a combination having relatively fewer is (e.g., {1, 4, 6, 8} in Table 4 below) is used. In other words, in TDD, a combination of ks of an equal or larger number than ks used in FDD is used. This combination may be preset according to FDD/TDD configuration or may be signaled through a physical layer/higher-layer signal by a network regardless of FDD/TDD configuration.

TABLE 4

| Combination index | Set of Ks | | | | Note | Total number of subframe indication bitmaps | Sum(k) |
|---|---|---|---|---|---|---|---|
| 0 | 1 | 2 | 4 | 8 | Same as FDD | 107 | 15 |
| 1 | 1 | 2 | 5 | 7 | | 100 | 15 |
| 2 | 1 | 2 | 5 | 8 | | 93 | 16 |
| 3 | 1 | 2 | 6 | 7 | | 72 | 16 |
| 4 | 1 | 2 | 6 | 8 | | 65 | 17 |
| 5 | 1 | 2 | 7 | 8 | | 45 | 18 |
| 6 | 1 | 3 | 5 | 7 | | 128 | 16 |
| 7 | 1 | 3 | 5 | 8 | | 121 | 17 |
| 8 | 1 | 3 | 6 | 7 | | 100 | 17 |
| 9 | 1 | 3 | 6 | 8 | | 93 | 18 |
| 10 | 1 | 3 | 7 | 8 | | 73 | 19 |
| 11 | 1 | 4 | 6 | 7 | | 114 | 18 |
| 12 | 1 | 4 | 6 | 8 | | 107 | 19 |
| 13 | 1 | 4 | 7 | 8 | | 87 | 20 |
| 14 | 1 | 5 | 6 | 7 | | 100 | 19 |
| 15 | 1 | 5 | 6 | 8 | | 93 | 20 |
| 16 | 1 | 5 | 7 | 8 | | 73 | 21 |
| 17 | 1 | 6 | 7 | 8 | | 45 | 22 |
| 18 | 2 | 3 | 6 | 7 | | 120 | 18 |
| 19 | 2 | 3 | 6 | 8 | | 113 | 19 |
| 20 | 2 | 3 | 7 | 8 | | 93 | 20 |
| 21 | 2 | 4 | 6 | 8 | | 127 | 20 |
| 22 | 2 | 4 | 7 | 8 | | 107 | 21 |
| 23 | 2 | 5 | 6 | 7 | | 120 | 20 |

TABLE 4-continued

| Combination index | Set of Ks | | | | Note | Total number of subframe indication bitmaps | Sum(k) |
|---|---|---|---|---|---|---|---|
| 24 | 2 | 5 | 6 | 8 | | 113 | 21 |
| 25 | 2 | 5 | 7 | 8 | | 93 | 22 |
| 26 | 2 | 6 | 7 | 8 | | 65 | 23 |
| 27 | 3 | 5 | 7 | 8 | | 121 | 23 |
| 28 | 3 | 6 | 7 | 8 | | 93 | 24 |
| 29 | 4 | 6 | 7 | 8 | | 107 | 25 |
| 30 | 5 | 6 | 7 | 8 | | 93 | 26 |

Configurations of Apparatuses According to Embodiment of the Present Invention

Figure 12:
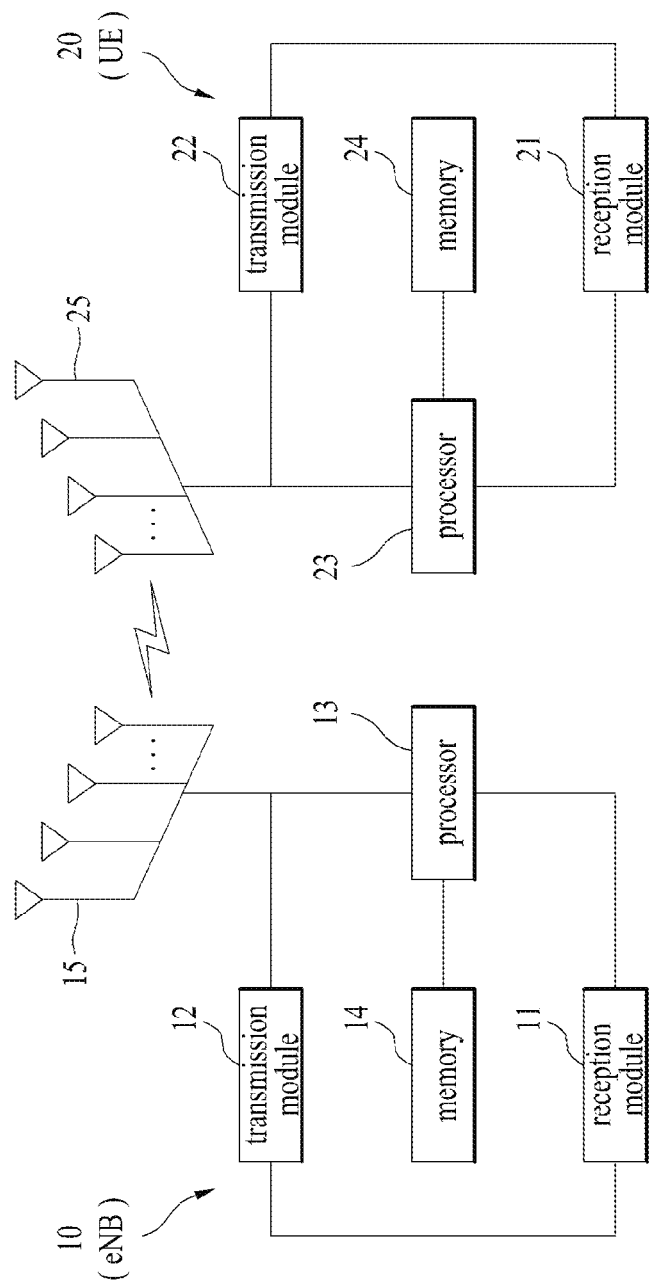
FIG. 12 is a diagram illustrating configuration and transmission and reception apparatuses.

FIG. 12 is a block diagram of a transmission point and a UE according to an embodiment of the present invention.

Referring to FIG. 12, a transmission point 10 according to the present invention may include a Reception (Rx) module 11, a Tx module 12, a processor 13, a memory 14, and a plurality of antennas 15. Use of the plurality of antennas 15 means that the transmission point 10 supports MIMO transmission and reception. The reception module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 12 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 12 is applicable to a relay as a DL transmitter or a UL receiver, and the description of the UE 20 in FIG. 12 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

What is claimed is:

1. A method for a first user equipment (UE) to communicate with a second UE in a wireless communication system, the method comprising:
receiving, by the first UE from a network node, a Radio Resource Control (RRC) information element related with a resource pattern for N subframes;
receiving, by the first UE from the second UE, a scheduling assignment (SA) including an index of a bitmap, wherein the index of the bitmap is for determining M subframes used for a data transmission within the N subframes,
wherein M is an integer related with a number of transmission subframes and is equal to or less than N;
receiving, by the first UE from the second UE, the data on the M subframes based on the index of the bitmap, wherein the information element related with the resource pattern for the N subframes is used for limiting available values for the index of the bitmap for the M subframes, and wherein the index of the bitmap is one bitmap out of a set of pre-configured bitmaps.

2. The method according to claim 1, wherein the first UE directly receives the data on the M subframes from the second UE.

3. The method according to claim 1, wherein the RRC information element relating with the resource pattern is for a transmission mode 2 UE.

4. A user equipment (UE) operating as a first UE communicating with a second UE in a wireless communication system, the UE comprising:
a processor; and
a memory connected to the processor and storing information executed by the processor to:
receive, from a network node, a Radio Resource Control (RRC) information element related with a resource pattern for N subframes;
receive, from the second UE, a scheduling assignment (SA) including an index of a bitmap, wherein the index of the bitmap is for determining M subframes used for a data transmission within the N subframes,
wherein M is an integer related with a number of transmission subframes and is equal to or less than N;
receive, from the second UE, the data on the M subframes based on the index of the bitmap,
wherein the information element related with the resource pattern for the N subframes is used for limiting available values for the index of the bitmap for the M subframes, and
wherein the index of the bitmap is one bitmap out of a set of pre-configured bitmaps.

5. The UE according to claim 4, wherein the first UE directly receives the data on the M subframes from the second UE.

6. The UE according to claim 4, wherein the RRC information element relating with the resource pattern is for a transmission mode 2 UE.

* * * * *